US012706998B2

(12) United States Patent
Park et al.

(10) Patent No.: US 12,706,998 B2
(45) Date of Patent: Aug. 11, 2026

(54) WINDOW AND ELECTRONIC DEVICE INCLUDING THE SAME

(71) Applicant: Samsung Display Co., Ltd., Yongin-si (KR)

(72) Inventors: Cheolmin Park, Yongin-si (KR); Byeong-Beom Kim, Yongin-si (KR); Seung Kim, Yongin-si (KR); Seungho Kim, Yongin-si (KR); Gyuin Shim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 357 days.

(21) Appl. No.: 18/311,953

(22) Filed: May 4, 2023

(65) Prior Publication Data

US 2024/0022657 A1 Jan. 18, 2024

(30) Foreign Application Priority Data

Jul. 13, 2022 (KR) ........................ 10-2022-0086308

(51) Int. Cl.
*H04M 1/02* (2006.01)

(52) U.S. Cl.
CPC ....... *H04M 1/0268* (2013.01); *H04M 1/0216* (2013.01)

(58) Field of Classification Search
CPC ............. H04M 1/0268; H04M 1/0216; H04M 1/0214; G09F 9/301; G06F 1/1641; H10K 77/111; H10K 2102/311
See application file for complete search history.

(56) References Cited

U.S. PATENT DOCUMENTS 10,216,230 B2 2/2019 Kim et al.
10,461,274 B2 * 10/2019 Kim ......................... H05K 5/03
10,986,744 B2 4/2021 Yeum et al.
2016/0159052 A1 * 6/2016 Kim .................. G02F 1/133308 361/679.01
2017/0028677 A1 * 2/2017 Lee ....................... B32B 27/281
2018/0132370 A1 * 5/2018 Choi ....................... B32B 27/06
2020/0292731 A1 * 9/2020 Park ...................... G06F 1/1641
2020/0324521 A1 * 10/2020 Park .......................... B24B 7/24
2020/0398530 A1 * 12/2020 Kuo .......................... B32B 7/12
2021/0107826 A1 * 4/2021 Hwang ............... C03C 17/3405
2021/0212229 A1 * 7/2021 Yeum ........................ B32B 7/12
2021/0367189 A1 11/2021 Hwang et al.
(Continued)

FOREIGN PATENT DOCUMENTS

KR 10-0627078 9/2006
KR 10-2018-0018925 2/2018
(Continued)

*Primary Examiner* — Angelica Perez
(74) *Attorney, Agent, or Firm* — Sughrue Mion, PLLC

(57) ABSTRACT

A window includes a first glass substrate, a second glass substrate facing the first glass substrate, and a bonding layer disposed between the first glass substrate and the second glass substrate. The window includes a first non-folding portion, a second non-folding portion, and a folding portion, the folding portion is disposed between the first non-folding portion and the second non-folding portion, and at least one of the first glass substrate and the second glass substrate includes a concave portion corresponding to the folding portion and defined on a surface adjacent to the bonding layer.

27 Claims, 13 Drawing Sheets

(56) References Cited

U.S. PATENT DOCUMENTS

2021/0379869 A1 12/2021 Choi et al.
2022/0287195 A1* 9/2022 Chen .................... G06F 1/1652

FOREIGN PATENT DOCUMENTS

KR 10-2018-0051695 5/2018
KR 10-2035927 10/2019
KR 10-2021-0144974 12/2021
KR 10-2021-0150626 12/2021

* cited by examiner

WINDOW AND ELECTRONIC DEVICE INCLUDING THE SAME

CROSS-REFERENCE TO RELATED APPLICATION(S)

This application claims priority to and benefits of Korean Patent Application No. 10-2022-0086308 under 35 U.S.C. § 119, filed on Jul. 13, 2022, in the Korean Intellectual Property Office (KIPO), the entire contents of which are incorporated herein by reference.

BACKGROUND

1. Technical Field

The disclosure relates to a foldable window and an electronic device including the same.

2. Description of the Related Art

Various types of electronic devices are used to provide image information, and recently, display devices including a flexible display panel which is foldable or bendable have been developed. Unlike a rigid display device, a flexible display device may have various shapes, such as folding, rolling, or bending shape, and thus is characterized by being portable regardless of the size of a display screen.

Such a flexible display device requires a window for protecting a display panel without inhibiting a folding or bending operation, and accordingly, there is a need for the development of a window having excellent mechanical properties while maintaining folding properties.

SUMMARY

The disclosure provides a window with excellent folding properties and improved impact resistance against external impacts.

The disclosure also provides an electronic device with good folding properties and high impact resistance.

An embodiment of the disclosure provides a window that may include a first glass substrate, a second glass substrate facing the first glass substrate, and a bonding layer disposed between the first glass substrate and the second glass substrate. The window may include a first non-folding portion, a second non-folding portion, and a folding portion. The folding portion may be disposed between the first non-folding portion and the second non-folding portion. At least one of the first glass substrate and the second glass substrate may include a concave portion corresponding to the folding portion and defined on a surface adjacent to the bonding layer.

In an embodiment, a pencil hardness of the bonding layer may be greater than or equal to approximately 6 H.

In an embodiment, the first glass substrate and the second glass substrate may each be a tempered may substrate.

In an embodiment, the concave portion may be defined on a surface of the first glass substrate adjacent to the bonding layer, and a surface of the second glass substrate adjacent to the bonding layer may be a flat surface.

In an embodiment, the first glass substrate may include a first portion corresponding to the folding portion, a second portion corresponding to the first non-folding portion and the second non-folding portion, and a third portion disposed between the first portion and the second portion, and having a thickness in a thickness direction of the first glass substrate increasing in a direction from the first portion to the second portion. An average thickness of the first portion in the thickness direction may be in a range of approximately 20 μm to approximately 100 μm, and an average thickness of the second portion in the thickness direction may be in a range of approximately 50 μm to approximately 300 μm.

In an embodiment, a surface of the third portion adjacent to the bonding layer may have an inclination angle of less than or equal to approximately 45 degrees with respect to a surface of the second portion.

In an embodiment, a length of a surface of the third portion adjacent to the bonding layer in a cross-sectional view may in a range of be approximately 10 mm to approximately 80 mm.

In an embodiment, an average thickness of the second glass substrate in a thickness direction of the second glass substrate may be in a range of approximately 30 μm to approximately 50 μm.

In an embodiment, an average thickness of the bonding layer in a thickness direction of the first glass substrate may be in a range of approximately 10 μm to approximately 100 μm.

In an embodiment, a first concave portion may be defined on a surface of the first glass substrate adjacent to the bonding layer, and a second concave portion overlapping the first concave portion in a thickness direction of the first glass substrate may be defined on a surface of the second glass substrate adjacent to the bonding layer.

In an embodiment, a width of the folding portion may be a distance between the first non-folding portion and the second non-folding portion, and the width of the folding portion may be in a range of approximately 20 mm to approximately 100 mm.

In an embodiment of the disclosure, a window may include a first glass substrate including a first portion, a second portion thicker than the first portion, and a third portion disposed between the first portion and the second portion and having a thickness in a thickness direction of the first glass substrate increasing in a direction from the first portion to the second portion, a second glass substrate facing the first glass substrate, and a bonding layer filling a space between the first glass substrate and the second glass substrate. The window may include a folding portion foldable with respect to a folding axis extending in a direction, and a first non-folding portion and a second non-folding portion spaced apart from each other. The folding portion may be disposed between the first non-folding portion and the second non-folding portion. The first portion may correspond to the folding portion, and the second portion may correspond to the first non-folding portion and the second non-folding portion.

In an embodiment, a concave portion recessed in a direction from a surface to another surface facing the surface of the first glass substrate may be defined on the surface of the first glass substrate adjacent to the bonding layer by the first portion and the third portion, and a surface of the second glass substrate adjacent to the bonding layer may be a flat surface.

In an embodiment, an average thickness of the first portion in a thickness direction of the first glass substrate may be in a range of approximately 20 μm to approximately 100 μm, an average thickness of the second portion in the thickness direction may be in a range of approximately 50 μm to approximately 300 μm, and an average thickness of the second glass substrate in the thickness direction may be in a range of approximately 30 μm to approximately μm.

In an embodiment, a surface of the third portion adjacent to the bonding layer may have an inclination angle of less than or equal to approximately 45 degrees with respect to a surface of the second portion.

In an embodiment, the second glass substrate may include a fourth portion corresponding to the folding portion, a fifth portion corresponding to the first non-folding portion and the second non-folding portion and thicker than the fourth portion, and a sixth portion having a thickness in a thickness direction of the second glass substrate increasing in a direction from the fourth portion to the fifth portion, and a concave portion recessed in a direction from a surface to another surface facing the surface of the second glass substrate may be defined on the surface of the second glass substrate adjacent to the bonding layer by the fourth portion and the sixth portion.

In an embodiment, a pencil hardness of the bonding layer may be greater than or equal to approximately 6 H.

In an embodiment of the disclosure, an electronic device may include a display module including a folding display portion foldable with respect to a folding axis extending in a direction, and a first non-folding display portion and a second non-folding display portion spaced apart from each other with the folding display portion interposed between the first non-folding display portion and the second non-folding display portion, and a window disposed on the display module, and including a folding portion corresponding to the folding display portion, and a first non-folding portion and a second non-folding portion respectively corresponding to the first non-folding display portion and the second non-folding display portion. The window may include a first glass substrate, a second glass substrate facing the first glass substrate, and a bonding layer disposed between the first glass substrate and the second glass substrate. At least one of the first glass substrate and the second glass substrate may include a concave portion corresponding to the folding portion and defined on a surface adjacent to the bonding layer.

In an embodiment, the at least one of the first glass substrate and the second glass substrate including the concave portion may include a first portion corresponding to the folding portion, a second portion corresponding to the first non-folding portion and the second non-folding portion, and a third portion disposed between the first portion and the second portion, and having a thickness in a thickness direction of the first glass substrate increasing in a direction from the first portion to the second portion. An average thickness of the first portion in a thickness direction of the first glass substrate may be in a range of approximately 20 μm to approximately 100 μm, and an average thickness of the second portion in the thickness direction may be in a range of approximately 50 μm to approximately 300 μm.

In an embodiment, a surface of the third portion adjacent to the bonding layer may have an inclination angle of less than or equal to approximately 45 degrees with respect to a surface of the second portion.

In an embodiment, a length of a surface of the third portion adjacent to the bonding layer in a cross-sectional view may be in a range of approximately 10 mm to approximately 80 mm.

In an embodiment, the concave portion may be defined on one of a surface of the first glass substrate and a surface of the second glass substrate which are adjacent to the bonding layer, and another one of the surface of the first glass substrate and the surface of the second glass substrate may be a flat surface.

In an embodiment, an average thickness of one of the first glass substrate and the second glass substrate having the flat surface may be in a range of approximately 30 μm to approximately 50 μm.

In an embodiment, an average thickness of the bonding layer may be in a range of approximately 10 μm to approximately 100 μm.

In an embodiment, a width of the folding portion may be a distance between the first non-folding portion and the second non-folding portion, and the width of the folding portion may be in a range of approximately 20 mm to approximately 100 mm.

In an embodiment, a first concave portion may be defined on a surface of the first glass substrate adjacent to the bonding layer, and a second concave portion overlapping the first concave portion in a thickness direction of the first glass substrate may be defined on a surface of the second glass substrate adjacent to the bonding layer.

In an embodiment, a pencil hardness of the bonding layer may be greater than or equal to approximately 6 H.

In an embodiment, in a folded state, a distance between upper surfaces of the window facing each other may be less than a distance between upper surfaces of the display module facing each other, the second glass substrate may be disposed more adjacent to the display module than the first glass substrate, the concave portion may be defined on a surface of the first glass substrate adjacent to the bonding layer, and a surface of the second glass substrate adjacent to the bonding layer may be a flat surface.

In an embodiment, in a folded state, a distance between upper surfaces of the display module facing each other may be less than a distance between upper surfaces of the window facing each other, the second glass substrate may be disposed more adjacent to the display module than the first glass substrate, the concave portion may be defined on a surface of the second glass substrate adjacent to the bonding layer, and a surface of the first glass substrate adjacent to the bonding layer may be a flat surface.

However, embodiments of the disclosure are not limited to those set forth herein. The above and other embodiments will become more apparent to one of ordinary skill in the art to which the disclosure pertains by referencing the detailed description of the disclosure given below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

Figure 1A:
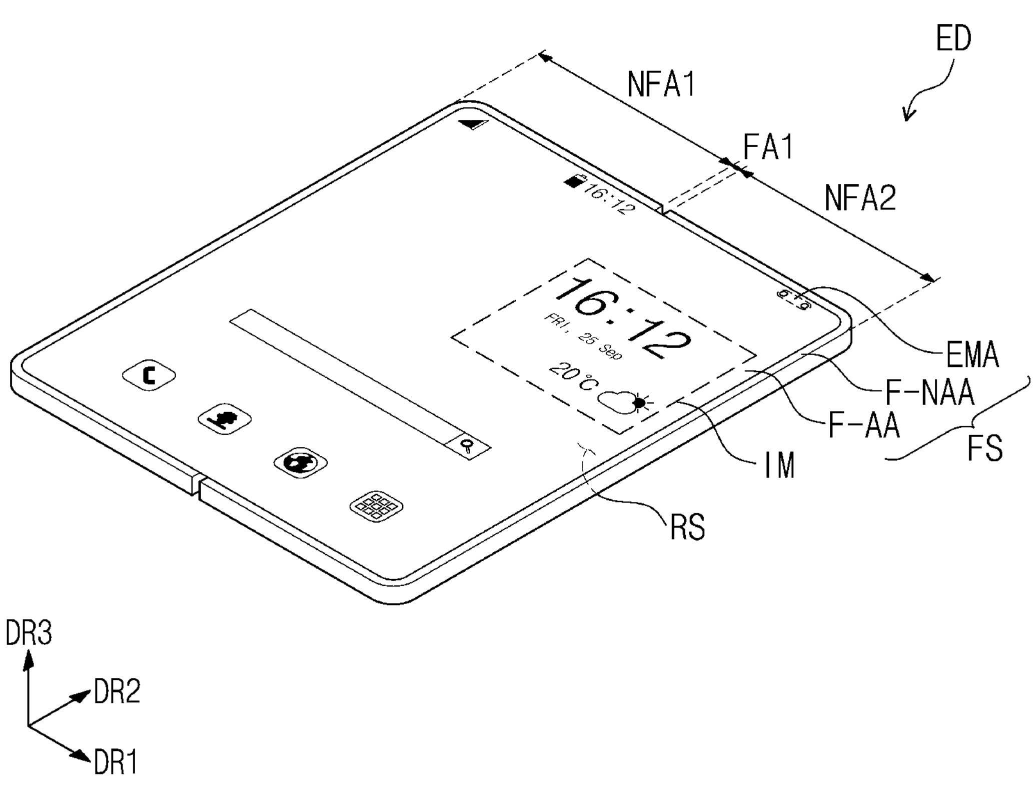
FIG. 1A is a perspective view showing an unfolded state of an electronic device according to an embodiment.

The disclosure may be modified into various forms, and thus specific embodiments will be illustrated in the drawings and described in detail. It should be understood, however, that it is not intended to limit the disclosure to the particular forms disclosed, but rather, is intended to cover all modifications, equivalents, and alternatives falling within the spirit and scope of the disclosure.

When an element, such as a layer, is referred to as being "on", "connected to", or "coupled to" another element or layer, it may be directly on, connected to, or coupled to the other element or layer or intervening elements or layers may be present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element.

In the disclosure, being "directly disposed" may mean that there is no layer, film, region, plate, or the like added between a portion of a layer, a film, a region, a plate, or the like and other portions. For example, being "directly disposed" may mean being disposed without additional members such as an adhesive member between two layers or two members.

Like reference numerals refer to like elements. Also, in the drawings, the thickness, the ratio, and the dimensions of elements are exaggerated for an effective description of technical contents. The term "and/or," includes all combinations of one or more of which associated components may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the disclosure. The terms of a singular form may include plural forms unless the context clearly indicates otherwise.

Spatially relative terms, such as "beneath", "below", "under", "lower", "above", "upper", "over", "higher", "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below", for example, can encompass both an orientation of above and below. Furthermore, the apparatus may be otherwise oriented (e.g., rotated 90 degrees or at other orientations), and, as such, the spatially relative descriptors used herein interpreted accordingly. In the disclosure, being "disposed on" may not only include the case of being disposed on an upper portion of any one member but also the case of being disposed on a lower portion thereof.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within ±30%, 20%, 10%, 5% of the stated value.

In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined, all terms (including technical and scientific terms) used herein have the same meaning as commonly understood by one of ordinary skill in the art to which the disclosure pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

The terminology used herein is for the purpose of describing particular embodiments and is not intended to be limiting. As used herein, the singular forms, "a", "an", and "the" are intended to include the plural forms as well, unless the context clearly indicates otherwise. Moreover, the terms "comprises", "comprising", "includes", and/or "including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, a window according to an embodiment of the disclosure and an electronic device using the window according to an embodiment of the disclosure will be described with reference to the accompanying drawings.

FIG. 1A is a perspective view showing an unfolded state of an electronic device according to an embodiment. FIG.

1B is a perspective view showing an in-folding process of an electronic device illustrated in FIG. 1A according to an embodiment. FIG. 1C is a perspective view showing an out-folding process of an electronic device illustrated in FIG. 1A according to an embodiment.

An electronic device ED of an embodiment may be a device activated according to an electrical signal. For example, the electronic device ED may be a mobile phone, a tablet computer, a car navigation system, a game console, or a wearable device, but the embodiment is not limited thereto. In the drawings, the electronic device ED is illustrated as a mobile phone.

Figure 1B:
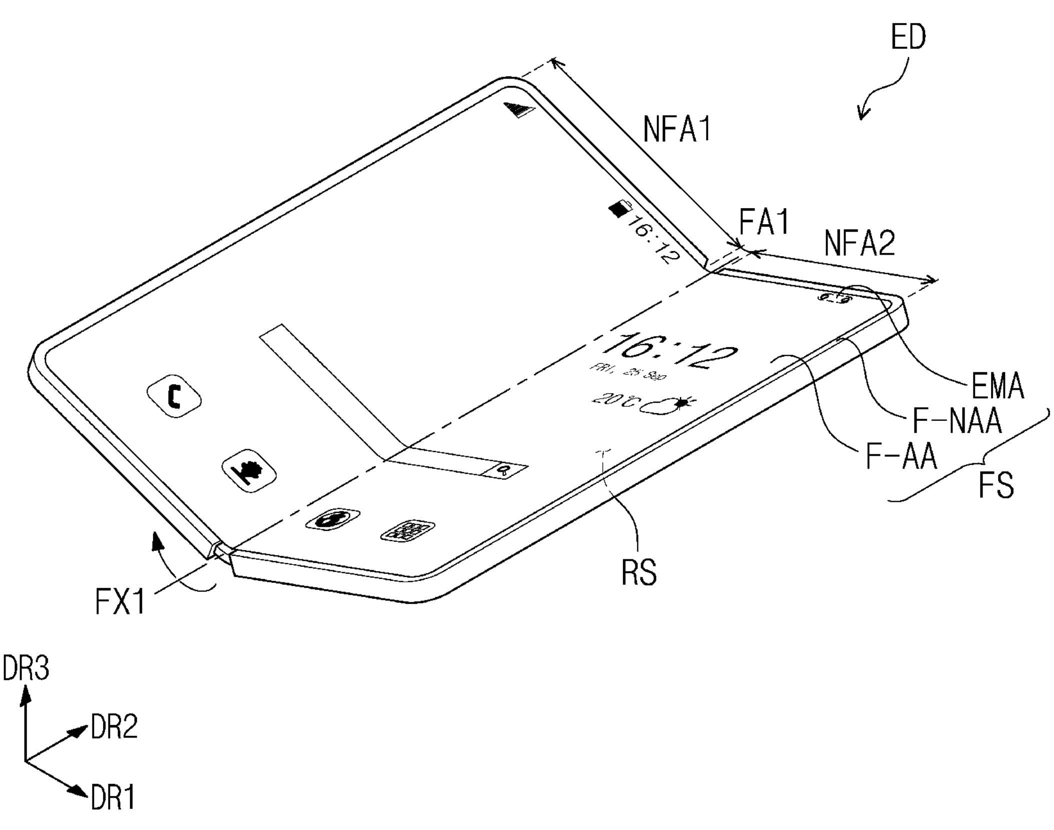
FIG. 1B is a perspective view showing an in-folding process of an electronic device illustrated in FIG. 1A according to an embodiment.
Figure 1C:
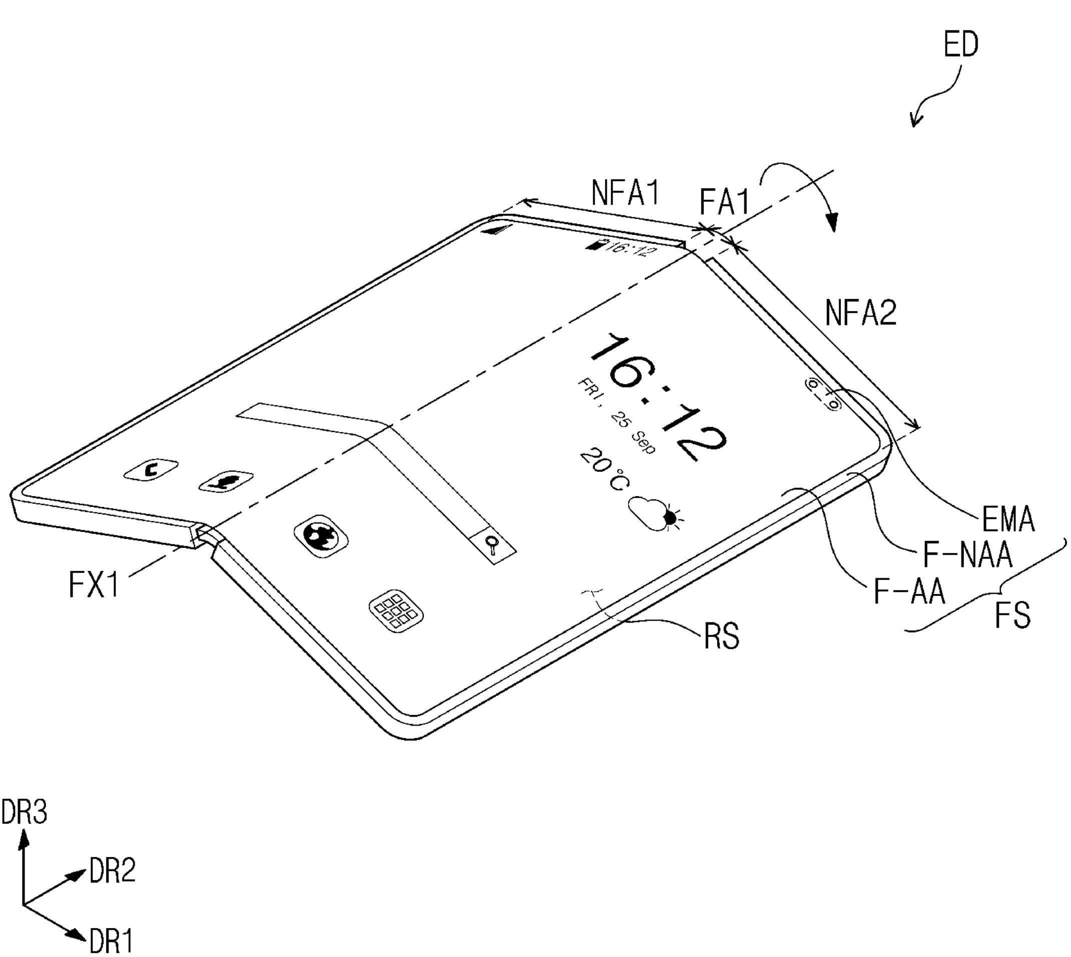
FIG. 1C is a perspective view showing an out-folding process of an electronic device illustrated in FIG. 1A according to an embodiment.

Referring to FIG. 1A to FIG. 1C, the electronic device ED according to an embodiment may include a first display surface FS defined by a first direction axis DR1 and a second direction axis DR2 crossing the first direction axis DR1. The electronic device ED may provide an image IM to a user through the first display surface FS. The electronic device ED of an embodiment may display the image IM toward a third direction axis DR3 direction on the first display surface FS parallel to each of the first direction axis DR1 and the second direction axis DR2. In the disclosure, a front surface (or an upper surface) and a rear surface (or a lower surface) of each component are defined on the basis of a direction in which the image IM is displayed. The front surface and the rear surface may face each other in the third direction axis DR3, and the normal direction of each of the front surface and the rear surface may be parallel to the third direction axis DR3.

The electronic device ED according to an embodiment may include the first display surface FS and a second display surface RS. The first display surface FS may include an active region F-AA and a peripheral region F-NAA. The active region F-AA may include an electronic module region EMA. The second display surface RS may be defined as a surface opposing (or facing) at least a portion of the first display surface FS. For example, the second display surface RS may be defined as a portion of a rear surface of the electronic device ED.

The electronic device ED according to an embodiment may sense an external input applied from the outside. The external input may include various forms of input provided from the outside of the electronic device ED. For example, the external input may include not only a contact by a part of a user's body, such as a hand, but also an external input applied in close proximity, or adjacent to the electronic device ED at a distance (for example, hovering). Also, the external input may have various forms such as force, pressure, temperature, light, and the like.

In FIG. 1A and the following drawings, the first direction axis DR1 to the third direction axis DR3 are illustrated. Directions indicated by the first to third direction axes DR1, DR2, and DR3 described in the disclosure are relative concepts, and may be converted to different directions. The directions indicated by the first to third direction axes DR1, DR2, and DR3 may be described as first to third directions, and may be denoted by the same reference numerals.

The active region F-AA of the electronic device ED may be a region activated according to an electrical signal. The electronic device ED according to an embodiment may display the image IM through the active region F-AA. Various forms of external inputs may be sensed in the active region F-AA. The peripheral region F-NAA may be disposed adjacent to the active region F-AA. The peripheral region F-NAA may have a color. The peripheral region F-NAA may surround the active region F-AA. Accordingly, the shape of the active region F-AA may substantially be defined by the peripheral region F-NAA. However, the disclosure is not limited thereto. The peripheral region F-NAA may be disposed adjacent to only one side of the active region F-AA, or may be omitted. The electronic device ED according to an embodiment of the disclosure may include an active region in various shapes, and is not limited to any one shape.

The electronic device ED may include a folding region FA1 and non-folding regions NFA1 and NFA2. In an embodiment, the non-folding regions NFA1 and NFA2 may be disposed adjacent to the folding region FA1 with the folding region FA1 interposed between the non-folding regions NFA1 and NFA2. The electronic device ED of an embodiment may include a first non-folding region NFA1 and a second non-folding region NFA2 spaced apart from each other in a first direction axis DR1 direction with the folding region FA1 interposed therebetween. For example, the first non-folding region NFA1 may be disposed on a side of the folding region FA1 in the first direction DR1, and the second non-folding region NFA2 may be disposed on another side of the folding region FA1 in the first direction DR1.

FIG. 1A to FIG. 1C illustrate an embodiment of the electronic device ED including one folding region FA1, but the disclosure is not limited thereto, and in the electronic device ED, multiple folding regions may be defined. For example, an electron device according to an embodiment may include two or more folding regions, and may include three or more non-folding regions disposed with each of the folding regions interposed therebetween.

Referring to FIG. 1B, the electronic device ED according to an embodiment may be folded with respect to a first folding axis FX1. The first folding axis FX1 may be a virtual axis extended in a second direction axis DR2 direction, and the first folding axis FX1 may be parallel to a direction of a long side of the electronic device ED. The first folding axis FX1 may extend in the second direction axis DR2 on the first display surface FS.

The electronic device ED may be folded with respect to the first folding axis FX1 and may become an in-folded state in which, in the first display surface FS, the first non-folding region NFA1 and the second non-folding region NFA2 face each other.

In the in-folded state, the second display surface RS of the electronic device ED according to an embodiment may be visually recognized by a user. The second display surface RS may include an electronic module region in which an electronic module including various components is disposed. However, the disclosure is not limited thereto.

Referring to FIG. 1C, the electronic device ED according to an embodiment may be folded with respect to the first folding axis FX1 and may become an out-folded state in which, in the second display surface RS, the first non-folding region NFA1 and the second non-folding region NFA2 face each other.

However, the embodiment of the disclosure is not limited thereto, and the electronic device ED may be folded with respect to multiple folding axes such that a portion of each of the first display surface FS and the second display surface RS may be folded to face each other, and the number of folding axes and the number of non-folding regions are not particularly limited.

The electronic module region EMA may have various electronic modules disposed therein. For example, the electronic module region EMA may include at least of a camera, a speaker, a light sensing sensor, and a heat sensing sensor. The electronic module region EMA may sense an external object, or may provide a sound signal such as voice to the outside. The electronic module may include multiple components, and is not limited to any one embodiment.

The electronic module region EMA may be surrounded by the active region F-AA and the peripheral region F-NAA. However, the embodiment of the disclosure is not limited thereto. The electronic module region EMA may be disposed within the active region F-AA.

Figure 2A:
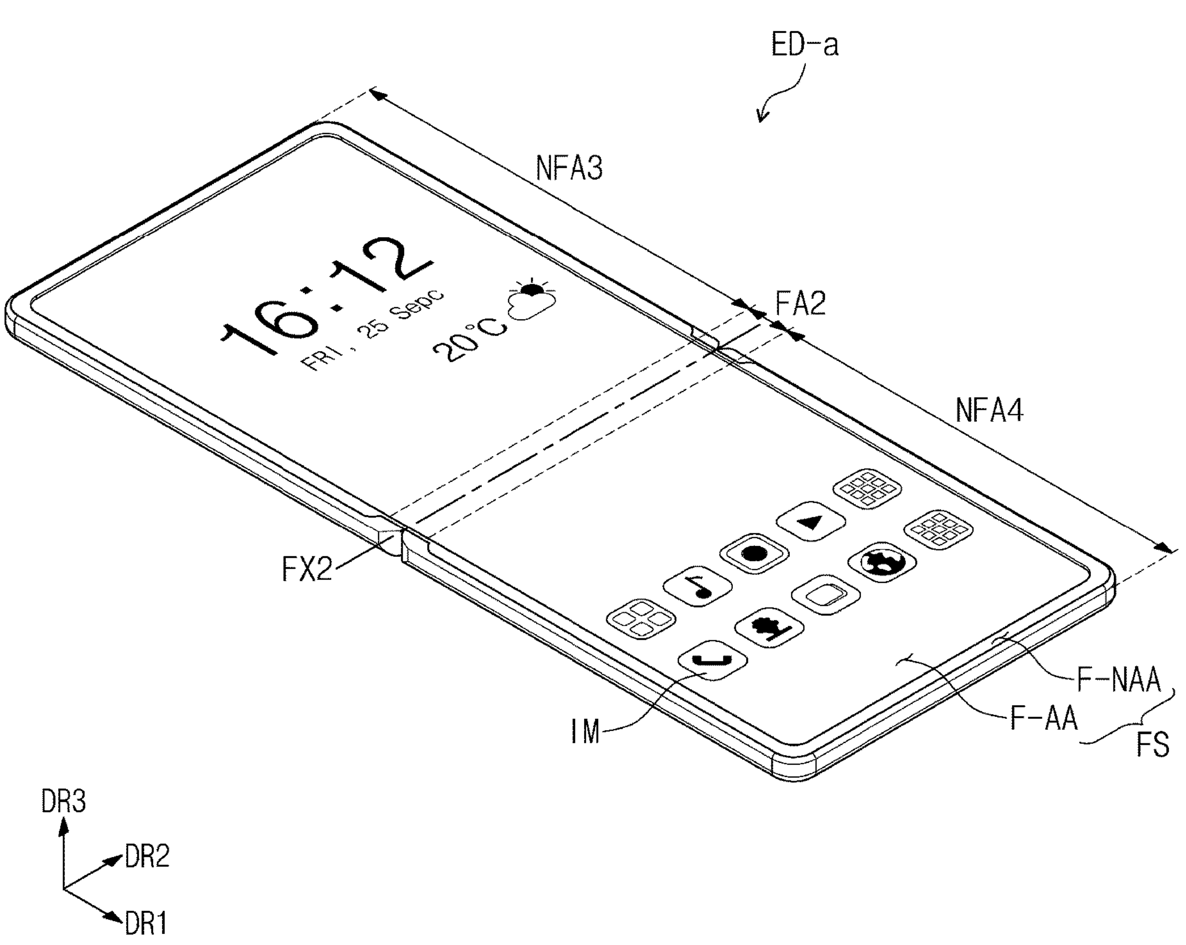
FIG. 2A is a perspective view showing an unfolded state of an electronic device according to an embodiment.
Figure 2B:
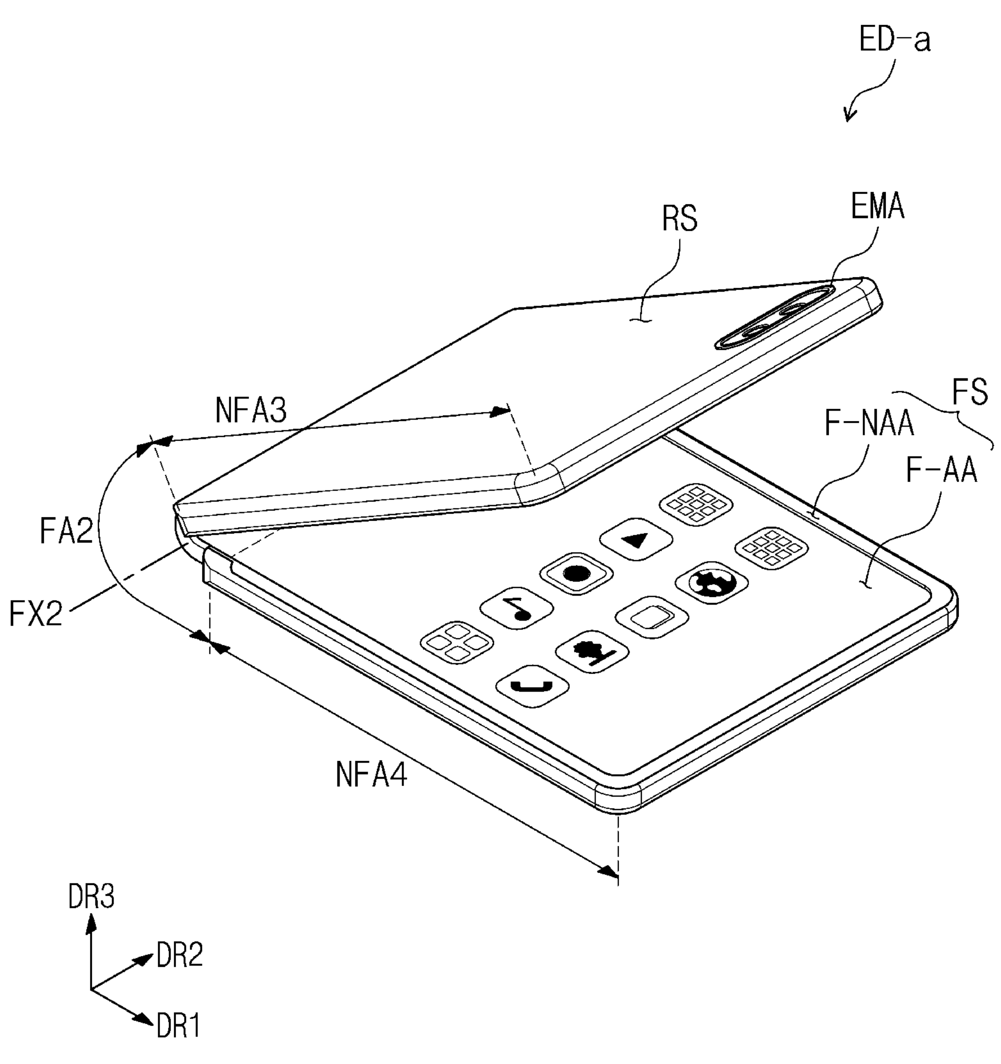
FIG. 2B is a perspective view showing an in-folding process of an electronic device illustrated in FIG. 2A according to an embodiment.
Figure 2C:
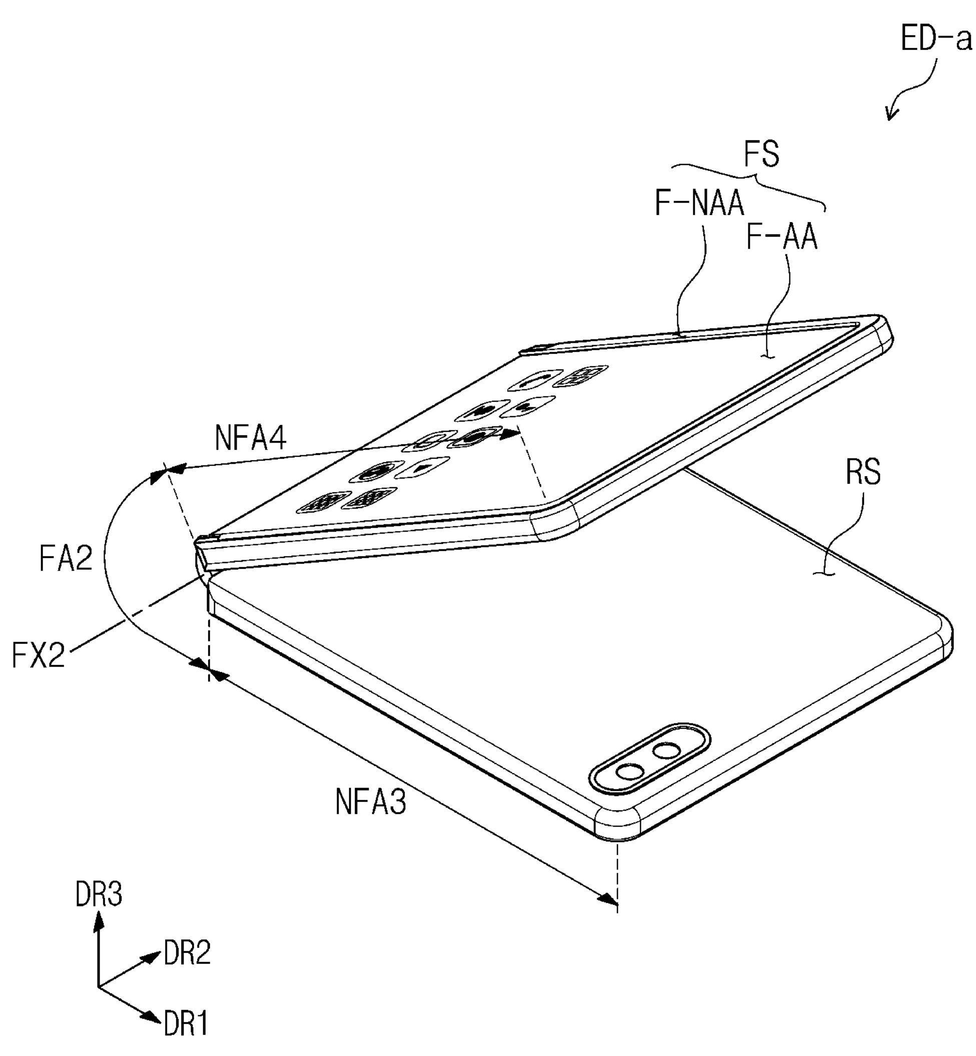
FIG. 2C is a perspective view showing an out-folding process of an electronic device illustrated in FIG. 2A according to an embodiment.

FIG. 2A is a perspective view showing an unfolded state of an electronic device according to an embodiment. FIG. 2B is a perspective view showing an in-folding process of the electronic device illustrated in FIG. 2A according to an embodiment. FIG. 2C is a perspective view showing an out-folding process of the electronic device illustrated in FIG. 2A according to an embodiment.

An electronic device ED-a of an embodiment may be folded with respect to a second folding axis FX2 extended in a direction parallel to the second direction axis DR2. FIG. 2B illustrates a case in which an extension direction of the second folding axis FX2 is parallel to an extension direction of a short side of the electronic device ED-a. However, the embodiment of the disclosure is not limited thereto.

The electronic device ED-a according to an embodiment may include at least one folding region FA2 and multiple non-folding regions NFA3 and NFA4 adjacent to the folding region FA2. The non-folding regions NFA3 and NFA4 may be spaced apart from each other with the folding region FA2 interposed between the non-folding regions NFA3 and NFA4.

The folding region FA2 may have a curvature and a radius of curvature. In an embodiment, in an in-folded state, a first non-folding region NFA3 and a second non-folding region NFA4 may face each other, and the electronic device ED-a may be in-folded such that the first display surface FS is not exposed to the outside. Referring to FIG. 2C, in an embodiment, the electronic device ED-a may be out-folded such that the first display surface FS is exposed to the outside.

The electronic device ED-a according to an embodiment may include the second display surface RS, and the second display surface RS may be defined as a surface opposing at least a portion of the first display surface FS. The second display surface RS may include an electronic module region EMA in which an electronic module including various components is disposed. In at least a portion of the second display surface RS, an image or a video may be displayed.

In an embodiment, in case that the electronic device ED-a is not folded, the first display surface FS may be visually recognized by a user, and in the in-folded state, the second display surface RS may be visually recognized by a user.

In an embodiment, the electronic devices ED and ED-a may be configured such that an in-folding or out-folding operation may be alternatively repeated from an un-folded state, but the embodiment of the disclosure is not limited thereto. In an embodiment, the electronic devices ED and ED-a may be configured to select one of the un-folding operation, the in-folding operation, and the out-folding operation. In case that multiple folding regions are included, a folding direction of at least one of the folding regions may be different from a folding direction of another folding region. For example, in case that two folding regions are included, two non-folding regions having a folding region interposed therebetween may be folded by the in-folding operation, and two non-folding regions having another folding region interposed therebetween may be folded by the out-folding operation.

Figure 3:
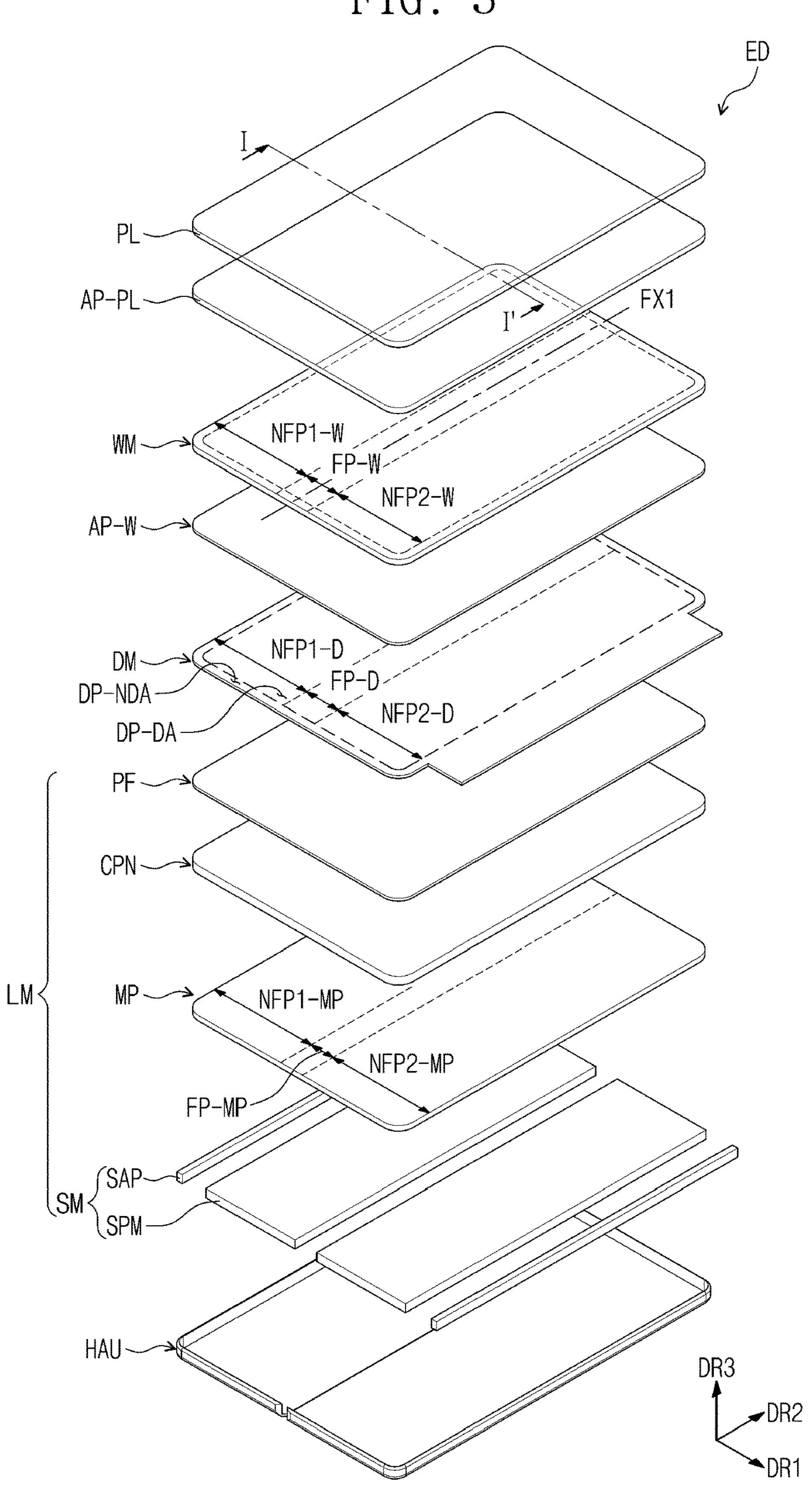
FIG. 3 is an exploded perspective view of an electronic device according to an embodiment of the disclosure.
Figure 4:
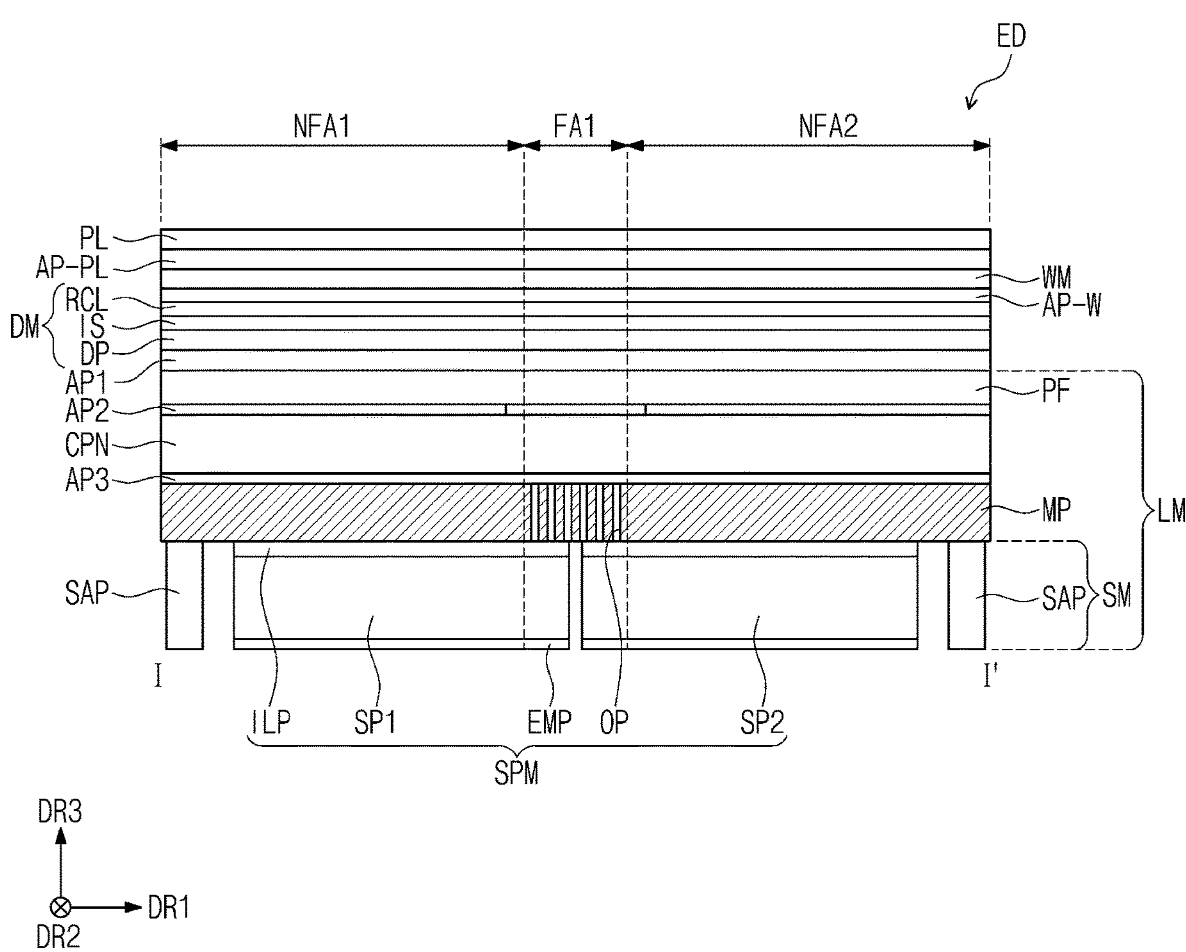
FIG. 4 is a schematic cross-sectional view of an electronic device according to an embodiment of the disclosure.

FIG. 3 is an exploded perspective view of an electronic device according to an embodiment, and FIG. 4 is a schematic cross-sectional view of an electronic device according to an embodiment. FIG. 3 illustrates an exploded perspective view of an electronic device illustrated in FIG. 1A according to an embodiment. FIG. 4 is a schematic cross-sectional view of the electronic device along line I-I' of FIG. 3.

In FIGS. 3, and 4, it is illustrated that the folding axis FX1 is parallel to a long side of the electronic device ED as in FIG. 1A, but the embodiment of the disclosure is not limited thereto. The description given with reference to the following drawings may be applied to a case in which the folding axis FX2 is parallel to a short side of an electronic device as illustrated in FIGS. 2A, 2B, and 2C.

Referring FIG. 3 and FIG. 4, the electronic device ED of an embodiment may include a display module DM, and a window WM disposed on an upper side of the display module DM. The electronic device ED of an embodiment may include a lower module LM disposed on a lower side of the display module DM.

The electronic device ED of an embodiment may include a window adhesive layer AP-W disposed between the display module DM and the window WM, and a protection film PL and a protection adhesive layer AP-PL disposed on an upper side of the window WM. In the electronic device ED of an embodiment, the protection film PL and the protection adhesive layer AP-PL may be omitted. In case that the protection film PL and the protection adhesive layer AP-PL are omitted, the window WM may be the uppermost surface of the electronic device ED.

The lower module LM may include a support plate MP disposed on a lower side of the display module DM. The lower module LM may be referred to as a support member.

The electronic device ED may include a housing HAU which accommodates the display module DM, the lower module LM, and the like. The housing HAU may be coupled to the window WM. Although not illustrated, the housing HAU may include a hinge structure for facilitating folding or bending. The window WM may be a cover window disposed on the display module DM.

The electronic device ED of an embodiment may include a window adhesive layer AP-W disposed between the display module DM and the window WM. The window adhesive layer AP-W may be an optically clear adhesive film (OCA) or an optically clear adhesive resin layer (OCR). In an embodiment, the window adhesive layer AP-W may be omitted.

The window WM may cover the entire upper surface of the display module DM. The window WM may have a shape corresponding to the shape of the display module DM. The window WM may include glass, and may be used as a cover window of the electronic device ED.

The window WM may include a folding portion FP-W and non-folding portions NFP1-W and NFP2-W. A first non-folding portion NFP1-W and a second non-folding portion NFP2-W of the window WM may be spaced apart from each other in the first direction DR1 with the folding portion FP-W interposed between the non-folding portions NFP1-W and NFP2-W. The folding portion FP-W may be a portion corresponding to the folding region FA1 (see FIG. 1A), and the non-folding portions NFP1-W and NFP2-W may be portions corresponding to the non-folding regions NFA1 and NFA2 (see FIG. 1A).

In an embodiment, the window WM may have a structure of a bonded glass in which multiple glass substrates are bonded each other. Each of the bonded glass substrates may be a tempered glass substrate. Each of the bonded glass substrates may be an ultra-thin tempered glass substrate. The window WM according to an embodiment will be described in more detail later.

The display module DM may display an image in accordance with an electrical signal, and may transmit/receive information of an external input. The display module DM may include a display region DP-DA and a non-display region DP-NDA. The display region DP-DA may be defined as a region which emits an image provided from the display module DM.

The non-display region DP-NDA may be disposed adjacent to the display region DP-DA. For example, the non-display region DP-NDA may surround the display region DP-DA. However, the disclosure is not limited thereto. The non-display region DP-NDA may be defined in various shapes, and is not limited to any one shape. According to an embodiment, the display region DP-DA of the display module DM may correspond to at least a portion of the active region F-AA (see FIG. 1A).

In an embodiment, the display module DM may include a display panel DP. The display panel DP may be a light emitting type display panel, but is not particularly limited thereto. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot, a quantum load, and the like.

The display module DM may further include an input sensor IS. The input sensor IS may be disposed directly on the display panel DP. The input sensor IS may include multiple sensing electrodes. The input sensor IS may sense an external input in a self-cap manner or mutual cap manner. The input sensor IS may sense an input by an active-type input device.

During manufacturing of the display panel DP, the input sensor IS may be formed directly on the display panel DP through a continuous process. However, the embodiment of the disclosure is not limited thereto, and the input sensor IS may be manufactured as a separate panel from the display panel DP, and be attached to the display panel DP by an adhesive layer (not shown).

The display module DM may further include an optical layer RCL. The optical layer RCL may perform a function of reducing reflection of an external light. For example, the optical layer RCL may include a polarizing layer or a color filter layer. However, the embodiment of the disclosure is not limited thereto, and the optical layer RCL may include optical members for improving the display quality of the electronic device ED.

In an embodiment, the optical layer RCL may be disposed directly on the input sensor IS. In case that the input sensor IS is omitted from the display module DM, the optical layer RCL may be on directly the display panel DP. However, the embodiment of the disclosure is not limited thereto, and the optical layer RCL may be disposed on the display panel DP or the input sensor IS using a separate adhesive member.

The display module DM may include a folding display portion FP-D and non-folding display portions NFP1-D and NFP2-D. The folding display portion FP-D may be a portion corresponding to the folding region FA1 (see FIG. 1A), and the non-folding display portions NFP1-D and NFP2-D may be portions corresponding to the non-folding regions NFA1 and NFA2 (see FIG. 1A).

The folding display portion FP-D may be a portion folded or bent with respect to the first folding axis FX1 (see FIGS. 1B and 1C). The display module DM may include a first non-folding display portion NFP1-D and a second non-folding display portion NFP2-D, and the first non-folding display portion NFP1-D and the second non-folding display portion NFP2-D may be spaced apart from each other with the folding display portion FP-D interposed between the non-folding display portions NFP1-D and NFP2-D.

In the electron device ED according to an embodiment, the lower module LM may include the support plate MP. In an embodiment, the lower module LM may further include a support module SM, a protection layer PF, and a buffer layer CPN. For example, the electronic device ED according to an embodiment may include the support plate MP disposed on a lower side of the display module DM, the protection layer PF and the buffer layer CPN disposed between the support plate MP and the display module DM, and the support module SM disposed on a lower side of the support plate MP.

In an embodiment, the support plate MP may be disposed on a lower side of the display module DM. The support plate MP may include a folding support portion FP-MP and non-folding support portions NFP1-MP and NFP2-MP. A first non-folding support portion NFP1-MP and a second non-folding support portion NFP2-MP of the support plate MP may be spaced apart from each other with the folding support portion FP-MP interposed between the non-folding support portions NFP1-MP and NFP2-MP. The folding support portion FP-MP may be a portion corresponding to the folding region FA1 (see FIG. 1A), and the non-folding support portions NFP1-MP and NFP2-MP may be portions corresponding to the non-folding regions NFA1 and NFA2 (see FIG. 1A). For example, the folding support portion FP-MP may include openings OP penetrating the support plate MP in the thickness direction of the support plate MP.

Referring to FIG. 3 and FIG. 4, the protection layer PF may be disposed between the display module DM and support plate MP. The protection layer PF may be a layer disposed on a lower side of the display module DM to support the rear surface of the display module DM. The protection layer PF may overlap the entire display module DM in the third direction DR3. The protection layer PF may include a polymer material. For example, the protection layer PF may be a polyimide film or a polyethylene terephthalate film. However, the material of the protection layer PF is not limited thereto.

The electronic device ED according to an embodiment may include the support module SM. The support module SM may include a support portion SPM and a filling portion SAP. The support portion SPM may be a portion overlapping most regions of the display module DM in the third direction DR3. The filling portion SAP may be a portion disposed on the outer side of the support portion SPM and overlapping the outer periphery of the display module DM in the third direction DR3.

The support module SM may include support layers SP1 and SP2. The support layers SP1 and SP2 may include a first sub-support layer SP1 and a second sub-support layer SP2 spaced apart from each other in the first direction axis DR1 direction. The first sub-support layer SP1 and the second sub-support layer SP2 may be spaced apart from each other in a portion corresponding to the first folding axis FX1 (see FIG. 1B and FIG. 1C). Since the support layers SP1 and SP2 are provided as the first sub-support layer SP1 and the second sub-support layer SP2 spaced apart from each other in the folding region FA1, the folding or bending properties of the electronic device ED may be improved. Although not illustrated, the support layers SP1 and SP2 may include a cushion layer (not shown) and a lower support plate (not shown) laminated in a thickness direction.

The lower support plate (not shown) may include a metal or a polymer. For example, the lower support plate may include stainless steel, aluminum, copper, or an alloy thereof.

The cushion layer (not shown) may prevent pressing or deformation of the support plate MP caused by external impact or force. The cushion layer (not shown) may include an elastomer such as sponge, foam, or a urethane resin. The cushion layer (not shown) may include at least one of an acrylic polymer, a urethane-based polymer, a silicon-based polymer, or an imide-based polymer. However, the embodiment of the disclosure is not limited thereto. The cushion layer (not shown) may be disposed on a lower side of the support plate MP or on a lower side of a lower support plate (not shown).

The support module SM may further include at least one of a shielding layer EMP and an interlayer bonding layer ILP. The shielding layer EMP may be an electromagnetic wave shielding layer or a heat dissipating layer. The shielding layer EMP may serve as a bonding layer. Using the shielding layer EMP, the support module SM and the housing HAU may be bonded.

The support module SM may further include the interlayer bonding layer ILP disposed on an upper side of the support layers SP1 and SP2. The interlayer bonding layer ILP may bond the support plate MP and the support module SM. The interlayer bonding layer ILP may be provided in the form of a bonding resin layer or an adhesive tape. For example, a portion of the interlayer bonding layer ILP overlapping the folding display portion FP-D may be removed. However, the embodiment of the disclosure is not limited thereto. The interlayer bonding layer ILP may overlap the entire folding display portion FP-D.

The filling portion SAP may be disposed at the outer periphery of the support layers SP1 and SP2. The filling portion SAP may be disposed between the support plate MP and the housing HAU. The filling portion SAP may fill a space between the support plate MP and the housing HAU, and may fix the support plate MP.

Referring to FIG. 3 and FIG. 4, the electronic device ED of an embodiment may include the buffer layer CPN in the lower module LM. The buffer layer CPN may serve as a thickness compensation layer which compensates the thickness of a lower side of the display module DM, or a support layer which supports the display module DM. Unlike the electronic device illustrated, in an embodiment, the buffer layer CPN may be omitted.

In the electronic device ED of an embodiment, the combination of components included in the lower module LM may vary depending on the size, shape, operation properties, or the like of the electronic device ED.

The electronic device ED of an embodiment may further include at least one adhesive layer AP1, AP2, and AP3. For example, a first adhesive layer AP1 may be disposed between the display module DM and the protection layer PF, a second adhesive layer AP2 may be disposed between the protection layer PF and the buffer layer CPN, and a third adhesive layer AP3 may be disposed between the support plate MP and the buffer layer CPN. At least one of the adhesive layers AP1, AP2, and AP3 may be an optically clear adhesive film (OCA) or an optically clear adhesive resin layer (OCR). However, the embodiment of the disclosure is not limited thereto, and at least one of the adhesive layers AP1, AP2, and AP3 may be an adhesive layer having low permeability of less than or equal to approximately 80%.

The electronic device ED of an embodiment may further include the protection film PL disposed on an upper portion of the window WM. The protection film PL may be disposed on an upper side of the window WM and may protect the window WM from an external environment. However, in the electronic device ED of an embodiment, the protection film PL may be omitted, and the window WM may be the uppermost surface of the electronic device ED.

The protection adhesive layer AP-PL may be disposed between the window WM and the protection film PL. The protection adhesive layer AP-PL may be an optically clear adhesive layer. In case that the electronic device ED of an embodiment includes the protection film PL, the protection film PL may be a layer exposed to the outside from the electronic device ED.

The protection film PL may have optical properties of a transmittance of greater than or equal to about 90% and a haze value of less than or equal to about 1% in a visible light region. The protection film PL may include a polymer film. The protection film PL may have a polymer film as a base layer, and may include, on the base layer, a functional layer such as a hard coating layer, an anti-fingerprint coating layer, an anti-static coating layer, and the like. The protection film PL in the electronic device ED of an embodiment may have flexibility.

Figure 5A:
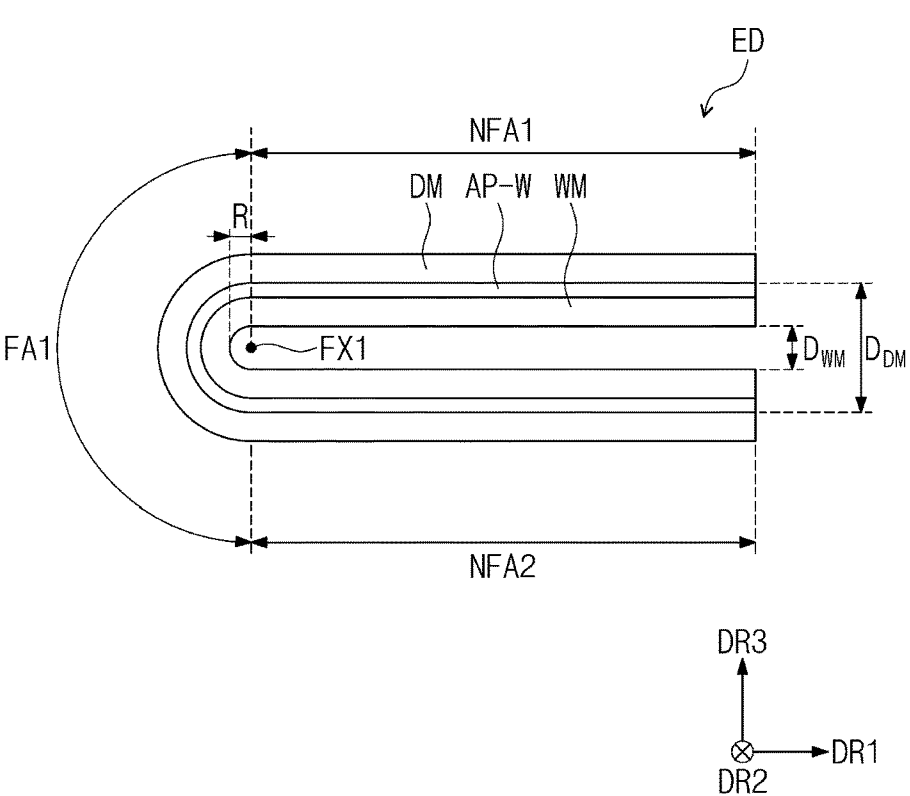
FIG. 5A is a schematic cross-sectional view showing a folded state of an electronic device according to an embodiment of the disclosure.
Figure 5B:
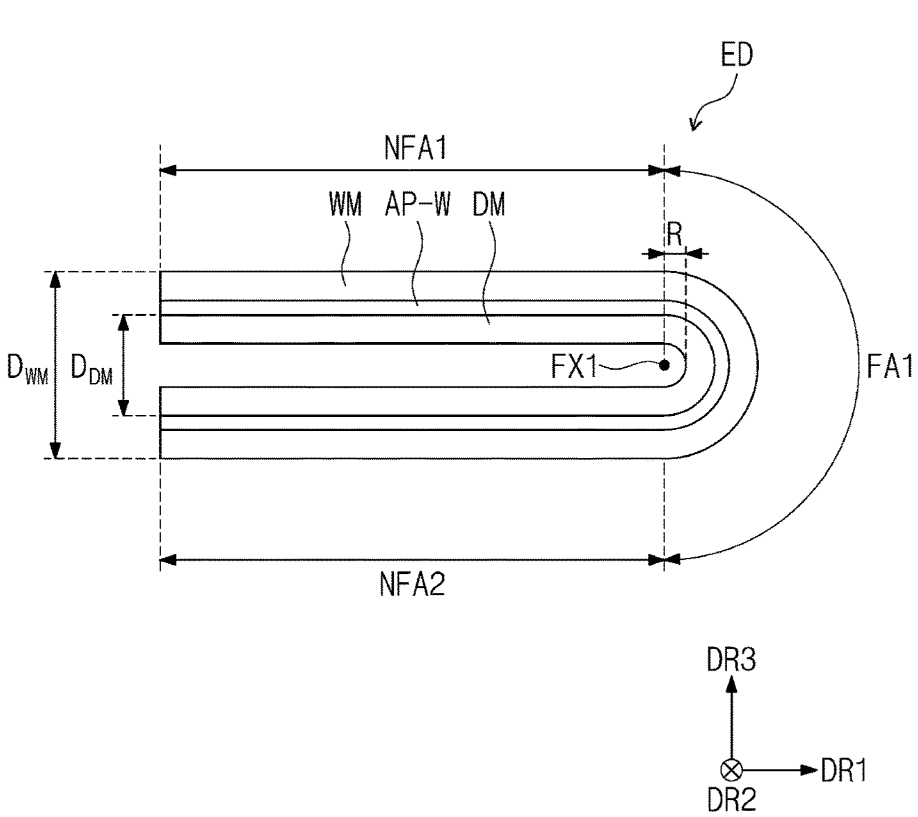
FIG. 5B is a schematic cross-sectional view showing a folded state of an electronic device according to an embodiment of the disclosure.

FIG. 5A and FIG. 5B are each a schematic cross-sectional view of the electronic device ED of an embodiment in a folded state. FIG. 5A and FIG. 5B schematically illustrate only the components of the display module DM, the window adhesive layer AP-W, and the window WM of the electronic device ED.

FIG. 5A shows a schematic cross-sectional view of the electronic device ED in an in-folded state, and in the electronic device ED of an embodiment, a distance $D_{WM}$ between upper surfaces of the window WM facing each other in a folded state may be less than a distance $D_{DM}$ between upper surfaces of the display module DM facing each other. In the electronic device ED of an embodiment, a radius of curvature R of the folding region FA1, which is in-folded with respect to the first folding axis FX1, may be less than or equal to approximately 1 mm. For example, since the window WM of an embodiment to be described later includes a glass substrate having a concave portion defined in the folding region, the bending radius limit may be reduced such that the radius of curvature R of the folding region FA1 is less than or equal to approximately 1 mm. However, the embodiment of the disclosure is not limited thereto, and the radius of curvature R of the folding region FA1 may be greater than approximately 1 mm.

The radius of curvature R may change according to the thickness of the glass substrate. As the thickness of the glass substrate decreases, the radius of curvature R may decrease. For example, in case that the thickness of the glass substrate decreases by approximately 10%, the radius of curvature of the glass substrate during folding may decrease by approximately 10%. In case that the thickness of the glass substrate is approximately 30 μm, the radius of curvature may be approximately 1 mm, and in case that the thickness of the glass substrate decreases to approximately 20 μm, the radius of curvature may decrease to approximately 0.67 mm. However, the radius of curvature R may decrease only to a range which satisfies a minimum flexural fracture strength value at which the glass substrate does not break during bending.

In an embodiment, the glass substrate may have a flexural fracture strength value or greater in order to have folding reliability, and for example, the range of the radius of curvature R according to the thickness of the glass substrate may be determined in a range which satisfies Equation 1. Equation 1 is an equation showing the relationship between breakage strength and physical properties, and folding properties of a glass substrate in a 2-point bending test.

$$\sigma=1.19814E/((1-v^2))t/((D-t)) \quad \text{[Equation 1]}$$

In Equation 1, σ corresponds to a required minimum flexural fracture strength value, E is the Young's modulus of a glass substrate, v is the Poisson's ratio of the glass substrate, t is the thickness of the glass substrate, and D corresponds to a gap between two jigs parallel to each other used in the 2-point bending test.

In an embodiment, in case that the minimum breakage strength required for a single glass substrate is 1.3 GPa or greater, and the thickness of the glass substrate is 30 μm, the distance D between two parallel jigs used in the 2-point bending test may be approximately 1 mm, which may be a value corresponding to a radius of curvature.

The Young's modulus of the glass substrate used in an embodiment may be in a range of approximately 70 GPa to approximately 75 GPa. For example, the Young's modulus of the glass substrate may be in a range of approximately 70 GPa to approximately 74 GPa. The Poisson's ratio of the glass substrate used in an embodiment may be in a range of approximately 0.20 to approximately 0.23. For example, the Poisson's ratio of the glass substrate may be in a range of approximately 0.20 to approximately 0.22.

FIG. 5B shows a schematic cross-sectional view of the electronic device ED in an out-folded state, and in the electronic device ED of an embodiment, the distance $D_{DM}$ between upper surfaces of the display module DM facing each other in a folded state may be less than the distance $D_{WM}$ between upper surfaces of the window WM facing each other. In the electronic device ED of an embodiment, a radius of curvature R of the folding region FA1 which is out-folded with respect to the first folding axis FX1 may be less than or equal to approximately 1 mm. For example, since the window WM of an embodiment to be described later includes a glass substrate having a concave portion defined in the folding region, the bending radius limit may be reduced such that the radius of curvature R of the folding region FA1 is less than or equal to 1 mm. However, the embodiment of the disclosure is not limited thereto, and the radius of curvature R of the folding region FA1 may be greater than 1 mm.

The Equation 1 above may also be applied to the electronic device ED in an out-folded state described with reference to FIG. 5B.

Figure 6:
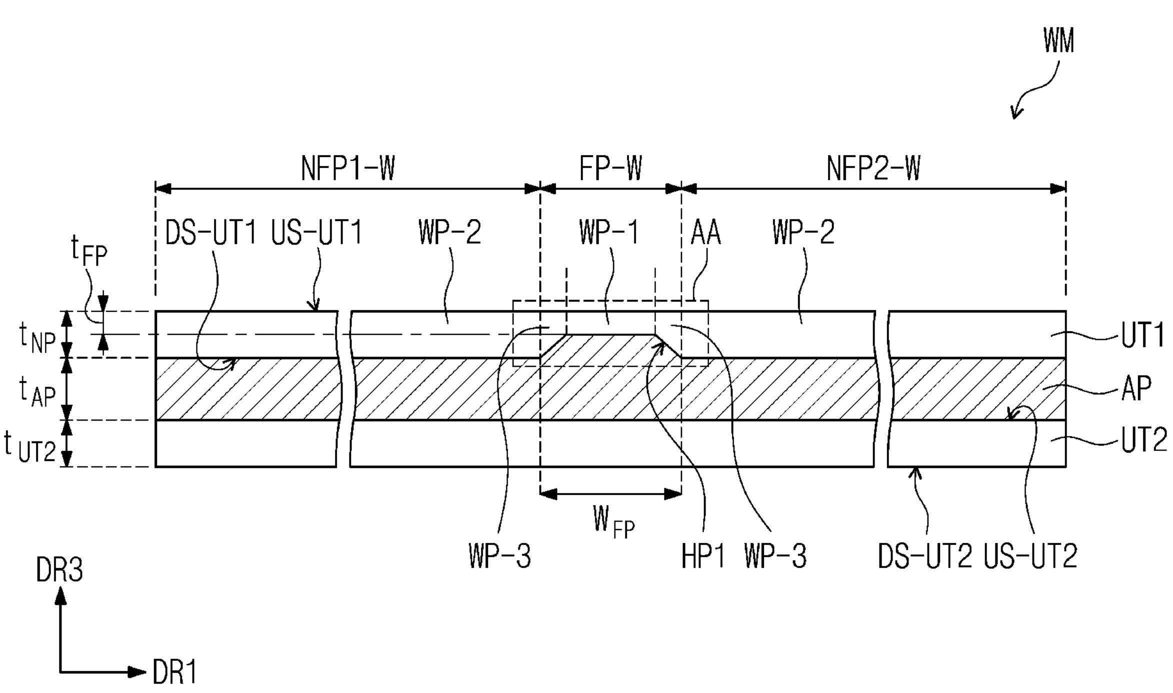
FIG. 6 is a schematic cross-sectional view of a window according to an embodiment of the disclosure.
Figure 7A:
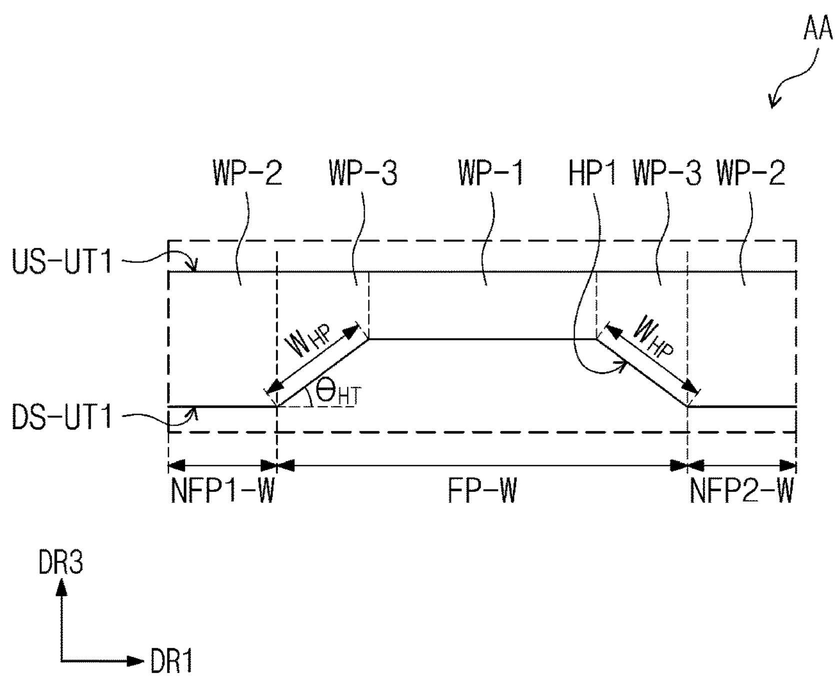
FIG. 7A is a schematic cross-sectional view showing a portion of a window according of an embodiment of the disclosure.
Figure 7B:
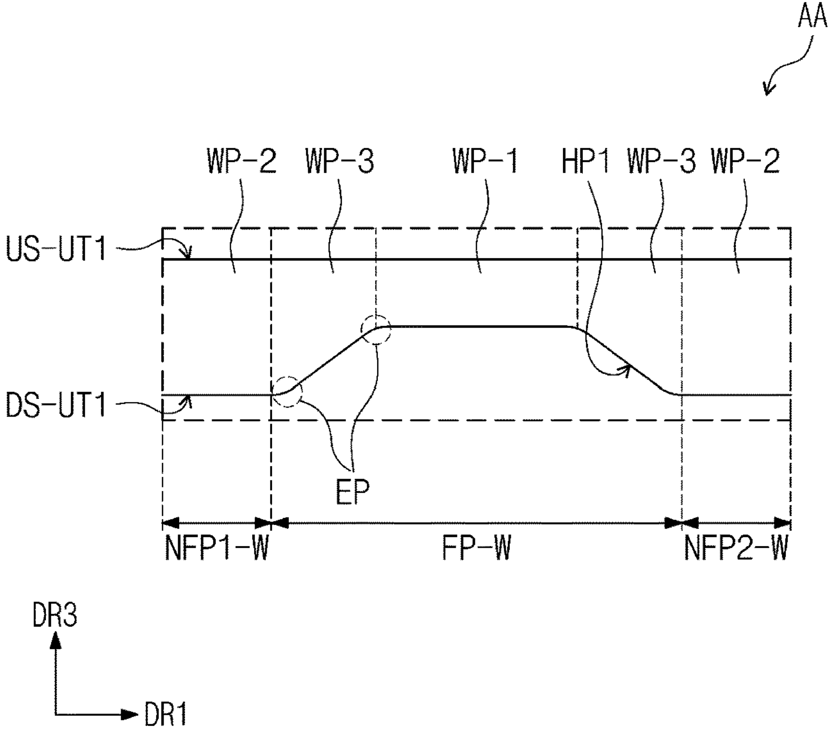
FIG. 7B is a schematic cross-sectional view showing a portion of a window according of an embodiment of the disclosure.

FIG. 6 is a schematic cross-sectional view of a window according to an embodiment of the disclosure. FIG. 7A and FIG. 7B are each a schematic cross-sectional view showing a portion of a window according of an embodiment of the disclosure. FIG. 7A is a schematic cross-sectional view showing region AA of FIG. 6 according to an embodiment, and FIG. 7B is a schematic cross-sectional view showing region AA of FIG. 6 according to another embodiment.

The window WM of an embodiment may include multiple glass substrates UT1 and UT2, and a bonding layer AP disposed between the glass substrates UT1 and UT2. For example, the window WM of an embodiment may have a structure of a bonded glass including multiple laminated glass substrates UT1 and UT2.

The window WM of an embodiment may include the first non-folding portion NFP1-W, the second non-folding portion NFP2-W, and the folding portion FP-W disposed between the first non-folding portion NFP1-W and the second non-folding portion NFP2-W.

Referring to FIG. 6, the window WM of an embodiment may include a first glass substrate UT1, a second glass substrate UT2, and the bonding layer AP disposed between the first glass substrate UT1 and the second glass substrate UT2. In the window WM of an embodiment, at least one of the first glass substrate UT1 and the second glass substrate UT2 may have a concave portion HP1 on a surface adjacent to the bonding layer AP in the folding portion FP-W. For example, the window WM of an embodiment may have a concave portion defined in one of the two bonded glass substrates UT1 and UT2, or may have a concave portion defined in both of the two glass substrates UT1 and UT2.

Each of the first substrate UT1 and the second substrate UT2 may be a tempered glass substrate. Each of the first substrate UT1 and the second substrate UT2 may be a chemically reinforced tempered glass substrate or thermally reinforced glass substrate. The reinforced first glass substrate UT1 and the reinforced second glass substrate UT2 may have different compressive stress properties. However, the embodiment of the disclosure is not limited thereto, and the reinforced first glass substrate UT1 and the reinforced second glass substrate UT2 may have similar compressive stress properties.

In the window WM of an embodiment illustrated in FIG. 6 and FIG. 7A, the second glass substrate UT2, the bonding layer AP, and the first glass substrate UT1 may be sequentially laminated in the third direction axis DR3 direction. In the electronic device ED (see FIG. 3) of an embodiment, the second glass substrate UT2 included in the window WM may be disposed adjacent to the display module DM. However, the embodiment of the disclosure is not limited thereto.

The first glass substrate UT1 may include an upper surface US-UT1 and a lower surface DS-UT1 facing in a thickness direction, and the second glass substrate may also include an upper surface US-UT2 and a lower surface DS-UT2 facing in a thickness direction. Referring to FIG. 6 and FIG. 7A, the lower surface DS-UT1 of the first glass substrate UT1, which is one surface of the first glass substrate UT1, and the upper surface US-UT2 of the second glass substrate UT2, which is one surface of the second glass substrate UT2, may each be a surface adjacent to the bonding layer AP. The bonding layer AP may fill a space between the first glass substrate UT1 and the second glass substrate UT2, and may be disposed directly on the first glass substrate UT1 and the second glass substrate UT2.

In the window WM of an embodiment, the concave portion HP1 may be defined on the lower surface DS-UT1 of the first glass substrate UT1. The concave portion HP1 may be defined on the lower surface DS-UT1 of the first glass substrate UT1, and may be concavely recessed in a direction from the lower surface DS-UT1 to the upper surface US-UT1 of the first glass substrate UT1. The concave portion HP1 may be a portion formed in the folding portion FP-W.

The concave portion HP1 may be defined on the lower surface DS-UT1 of the first glass substrate UT1 through a slimming process. In the slimming process, a physical polishing method, a chemical polishing method, or the like may be used. In an embodiment, the concave portion HP1 may be formed by slimming one surface of a glass substrate using a laser.

In an embodiment, a portion of the first glass substrate UP1 in which the concave portion HP1 is defined may be thinner than other portions. For example, in an embodiment, an average thickness of the folding portion FP-W of the first glass substrate UT1 may be less than an average thickness of the non-folding portions NFP1-W and NFP2-W. The window WM of an embodiment may include a glass substrate which is relatively thinner in the folding portion FP-W than the non-folding portions NFP1-W and NFP2-W, and thus, may have good folding properties.

Referring to FIG. 6 and FIG. 7A, the first glass substrate UT1 may include a first portion WP-1 corresponding to the folding portion FP-W, a second portion WP-2 corresponding to the first non-folding portion NFP1-W and the second non-folding portion NFP2-W, and a third portion WP-3 disposed between the first portion WP-1 and the second portion WP-2. The thickness of the third portion WP-3 may increase in a direction from the first portion WP-1 to the second portion WP-2.

An average thickness $t_{FP}$ of the first portion WP-1 may be in a range of approximately 20 μm to approximately 100 μm, and an average thickness $t_{NP}$ of the second portion WP-2 may be in a range of approximately 50 μm to approximately 300 μm. For example, in an embodiment, the average thickness $t_{FP}$ of the first portion WP-1 may be in a range of approximately 20 μm to approximately 30 μm, and the average thickness $t_{NP}$ of the second portion WP-2 may be in a range of approximately 50 μm to approximately 100 μm. In case that the thickness of the first portion WP-1 is less than the thickness of the second portion WP-2, the average thickness $t_{FP}$ of the first portion WP-1 is approximately 20 μm to approximately 100 μm, and the average thickness $t_{NP}$ of the second portion WP-2 is approximately 50 μm to approximately 300 μm, the window WM of an embodiment may have good folding properties and excellent impact resistance.

In an embodiment, the difference between the average thickness $t_{FP}$ of the first portion WP-1 and the average thickness $t_{NP}$ of the second portion WP-2 may be less than or equal to approximately 30 μm. In case that the difference between the average thickness $t_{FP}$ of the first portion WP-1 and the average thickness $t_{NP}$ of the second portion WP-2 is less than or equal to approximately 30 μm, a visibility problem due to a difference in thickness between the first part WP-1 and the second part WP-2 may be minimized.

In the window WM of an embodiment, the folding portion FP-W of the first glass substrate UT1 may include the first portion WP-1 and the third portion WP-3 disposed on both side of the first portion WP-1. The first portion WP-1 of the first glass substrate UT1 in the folding portion FP-W may be a portion in which the lower surface DS-UT1 is a flat surface parallel to the upper surface US-UT1. The third portion WP-3 may be a portion in which the lower surface DS-UT1 is an inclined surface.

The concave portion HP1 formed on a surface DS-UT1 adjacent to the bonding layer AP in the first glass substrate UT1 may be defined on a lower surface of the first portion WP-1 and a lower surface of the third portion WP-3. The bonding layer AP may fill the concave portion HP1.

An inclination angle $\Theta_{HT}$ of the third portion WP-3 may be less than or equal to approximately 45 degrees. The inclination angle $\Theta_{HT}$ of the third portion WP-3 may be an inclination angle of the lower surface DS-UT1 of the third portion WP-3 with respect to the lower surface DS-UT1 of the second portion WP-2. In the disclosure, the inclination angle $\Theta_{HT}$ may mean an inclination angle of a surface defining a concave portion with respect to an extended surface of one surface of a glass substrate in which the concave portion is defined. In FIG. 7A, the inclination angle $\Theta_{HT}$ of the third portion WP-3 may be an inclination angle with respect to an extension surface of the lower surface DS-UT1 of the second portion WP-2.

In the window WM of an embodiment, in case that the third portion WP-3 disposed between the first portion WP-1 and the second portion WP-2 has a gentle slope of 45 degrees or less, a visibility problem due to a difference in thickness between the first part WP-1 and the second part WP-2 may be minimized.

A length $W_{HP}$ of the third portion WP-3 may be in a range of approximately 10 mm to approximately 80 mm. The length $W_{HP}$ of the third portion WP-3 may be a length of a portion connecting the first portion WP-1 and the second portion WP-2, which may be a length of a surface adjacent to the bonding layer AP. The length $W_{HP}$ of the third portion WP-3 may be a length adjacent to the bonding layer AP in a cross-sectional view.

In an embodiment, the first concave portion HP1 may be defined such that the inclination angle $\Theta_{HT}$ of one surface of the third portion WP-3 is less than or equal to approximately 45 degrees, and the length $W_{HP}$ of each of the third portions WP-3 is in a range of approximately 10 mm to approximately 80 mm, and a visibility problem due to a difference in thickness between the first part WP-1 and the second part WP-2 may be minimized.

A lower surface of the third portion WP-3 on a cross-section parallel to a surface defined by the first direction axis DR1 and third direction axis DR3 may have a linear shape connecting the first portion WP-1 and the second portion WP-2. For example, in an embodiment, the concave portion HP1 may be defined as a lower surface of the first portion WP-1 which a flat surface and a lower surface of the third portion WP-3 which is a diagonal surface. However, the shape of the concave portion HP1 defined in the glass substrate UT1 is not limited to that illustrated in FIG. 7A.

FIG. 7B is a portion corresponding to region AA of FIG. 6, and shows a cross-section of a portion of the window WM. Compare to that illustrated in FIG. 7A, a window according to an embodiment illustrated in FIG. 7B has a difference in the shape of the concave portion HP1. Referring to FIG. 7B, an edge EP of the third portion WP-3 may have a curved surface compared to that of the third portion WP-3 illustrated in FIG. 7A. For example, in a window of an embodiment, at least one of a portion in which the third portion WP-3 and the first portion WP-1 are in contact, and a portion in which the third portion WP-3 and the second portion WP-2 are in contact may be formed to have a curved surface. A surface of the third portion WP-3 defining the concave portion HP1 may also have a curved surface shape. According to the embodiment, the inclination angle of the lower surface DS-UT1 of the third portion WP-3 with respect to the lower surface DS-UT1 of the second portion WP-2 adjacent to the bonding layer AP may be less than or equal to approximately 45 degrees.

The shape of the concave portion HP1 is not limited to those illustrated in FIG. 7A and FIG. 7B, and may be variously changed within a range that satisfies thickness ranges of the first portion WP-1 and the second portion WP-2 and inclination angle of the third portion WP-3.

Referring back to FIG. 6, a width WFP of the folding portion FP-W may be in a range of approximately 20 mm to approximately 100 mm. The width $W_{FP}$ of the folding portion FP-W may be a distance between the first non-folding portion NFP1-W and the second non-folding portion NFP2-W. The width $W_{FP}$ of the folding portion FP-W may be a width of the first portion WP-1 and the third portion WP-3 in the first glass substrate UT1. Since the folding portion FP-W has a width in a range of approximately 20 mm to approximately 100 mm, the electronic device ED (see FIG. 3) including the window WM may have good folding properties.

In the window WM of an embodiment, the upper surface US-UT2 of the second glass substrate UT2 which is a surface of the second glass substrate UT2 adjacent to the bonding layer AP may be a flat surface. An average thickness $t_{UT2}$ of the second glass substrate UT2 may be in a range of approximately 30 μm to approximately 50 μm. The average thickness $t_{UT2}$ of the second glass substrate UT2 may be different from an average thickness of the first glass substrate UT1. However, the embodiment of the disclosure is not limited thereto.

In an embodiment, the average thickness $t_{UT2}$ of the second glass substrate UT2 may be greater than the average thickness $t_{FP}$ of the first portion WP-1 of the first glass substrate UT1. Accordingly, the second glass substrate UT2 may be readily handled during manufacturing of the window WM.

The bonding layer AP may have a high hardness and a high Young's modulus. Since bonding layer AP has a high hardness and a high Young's modulus, the impact resistance of the window WM of an embodiment including the same may increase.

In an embodiment, the pencil hardness of the bonding layer AP may be greater than or equal to approximately 6 H. For example, in an embodiment, the pencil hardness of the bonding layer AP may be greater than or equal to approximately 9 H. The pencil hardness of the bonding layer AP may be measured on the surface of the bonding layer AP after providing a bonding layer resin and the like and curing the same to form the bonding layer AP.

The pencil hardness may be evaluated by the standard evaluation method of ASTM 3363. For example, the pencil hardness may be evaluated as a maximum value of pencil hardness at which no marks were left on a surface by tilting pencils of different hardness at 45 degrees with respect to a test surface and scratching the test surface while applying a load of 450 g.

The bonding layer AP may be a bonding layer which couples the first glass substrate UT1 and the second glass substrate UT2, or may be a filling layer which fills a space between the first glass substrate UT1 and the second glass substrate UT2. The bonding layer AP may be a layer formed of an organic material. The bonding layer AP may include a siloxane-based compound, an acrylate-based compound, a urethane-based compound, an epoxy-based compound, or the like. The bonding layer AP may be a layer formed of a polymer material. However, the disclosure is not limited thereto, and the bonding layer AP having a high hardness and a high Young's modulus may include an inorganic material. The bonding layer AP included in the window WM may be optically transparent. In case that the optical properties of the bonding layer AP are maintained, various materials may be included in order to increase the strength of the bonding layer AP.

An average thickness $t_{AP}$ of the bonding layer AP may be in a range of approximately 10 μm to approximately 100 μm. For example, the average thickness $t_{AP}$ of the bonding layer AP may be in a range of approximately 30 μm to approximately 80 μm. The bonding layer AP may have an average thickness in a range of approximately 10 μm to approximately 100 μm, and have a high hardness and a high Young's modulus, so that even in case that the thickness of a glass substrate in the folding portion FP-W is reduced, the impact resistance of the window WM may be improved.

The window WM of an embodiment may form a concave portion HP1 in at least one of the glass substrates UT1 and UT2 to relatively reduce the thickness of a portion which requires folding, and thus, may maintain good folding properties, and may include the glass substrates UT1 and UT2 bonded by the bonding layer AP having a high hardness, and thus, may have excellent impact resistance. Since excellent impact resistance and strength may be maintained by having a structure including the glass substrates UT1 and UT2 bonded by the bonding layer AP, the window WM of an embodiment may further reduce the thickness of a glass substrate in the folding portion FP-W compared to a case in which a single glass substrate is used as a window, and accordingly, the radius of curvature in the folding region may also be reduced. Therefore, an electronic device including the window WM of an embodiment may have a radius of curvature of less than or equal to approximately 1 mm, and may have good folding properties and excellent impact resistance.

The window WM of an embodiment may include the glass substrates UT1 and UT2 bonded by the bonding layer AP having a high hardness, and thus, may have excellent impact resistance compared to a case in which a typical window WM including only a single glass substrate is used, or a bonding layer AP having a low hardness is used. Accordingly, in case that the window WM of an embodiment is used in the electronic device ED (see FIG. 3), the protection film PL (see FIG. 3) which protects the window WM, the display module DM, and the like may be omitted. In the electronic device ED (see FIG. 3) of an embodiment, the window WM may be the uppermost surface. Accordingly, the degradation in the optical properties in an electronic device, which may occur in case that the protection film PL (see FIG. 3) and the like are applied, may be prevented, and properties such as a user's touch sensitivity and aesthetics as a glass substrate becomes the outermost periphery surface may be improved.

The window WM illustrated in FIG. 6 to FIG. 7B may be used as a cover window in the above-described electronic device. In case that the window WM of an embodiment in which the concave portion HP1 is defined in the first glass substrate UT1 disposed in an upper portion between the two glass substrates is applied to an electronic device with an in-folding operation in which the display module DM and the window WM are folded as illustrated in FIG. 5A, a distance $D_{WM}$ between upper surfaces of the window facing each other may be less than a distance $D_{DM}$ between upper surfaces of the display module facing each other. However, the embodiment of the disclosure is not limited thereto.

Figure 8:
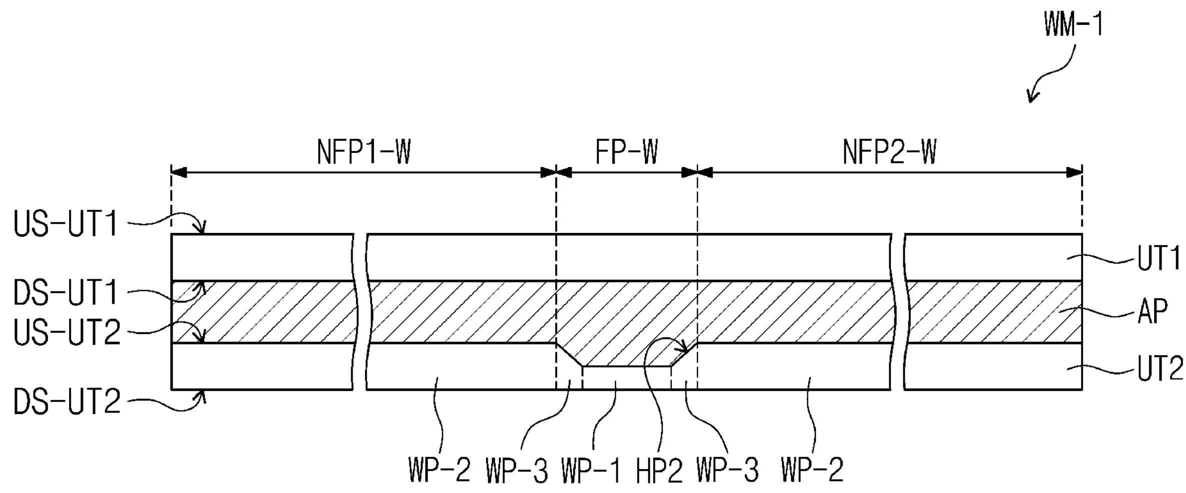
FIG. 8 is a schematic cross-sectional view of a window according to an embodiment of the disclosure.
Figure 8:
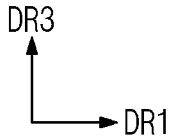
Figure 9:
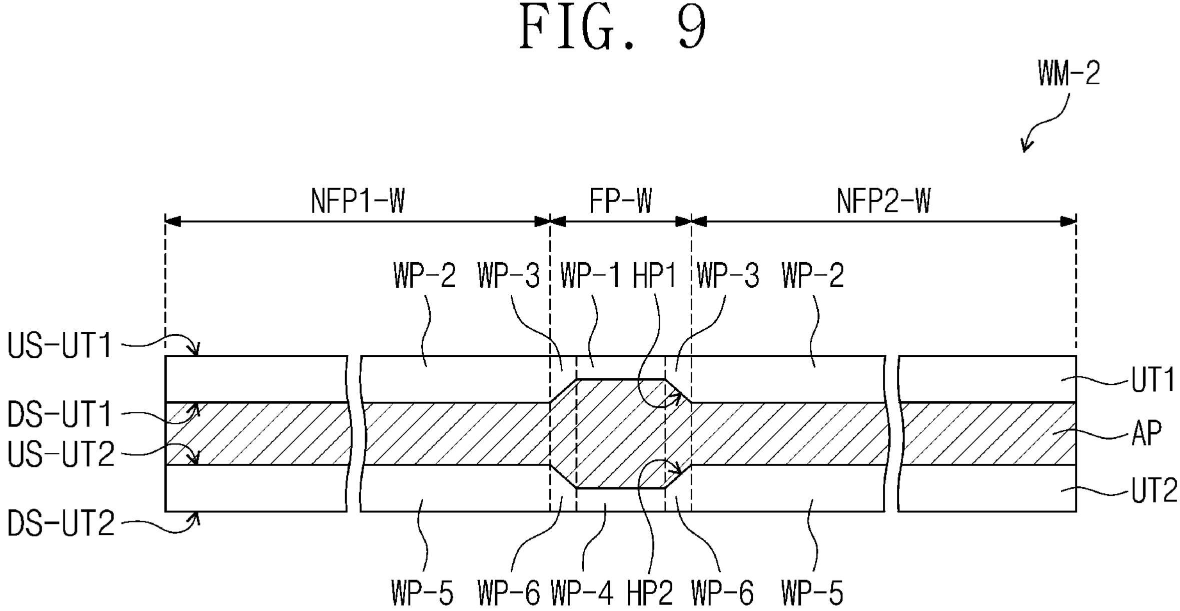
FIG. 9 is a schematic cross-sectional view of a window according to an embodiment of the disclosure.
Figure 9:
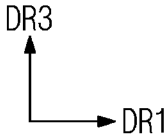

FIG. 8 and FIG. 9 are each a schematic cross-sectional view showing a window according to an embodiment of the disclosure. Compare to the window of an embodiment described with reference to FIG. 6 and FIG. 7A, the window illustrated in FIG. 8 and FIG. 9 has a difference in the arrangement of the concave portion. In the description of the window of an embodiment illustrated in FIG. 8 and FIG. 9, the same contents as those described with reference to FIG. 1 to FIG. 7B will not be described again, and instead, differences will be described.

Compare to the window WM illustrated in FIG. 6, a window WM-1 of an embodiment illustrated in FIG. 8 has a difference in that the concave portion HP1 is defined in the second glass substrate UT2. In FIG. 8, the window WM-1 may have a concave portion HP2 on the second glass substrate UT2 disposed relatively on a lower side with respect to the third direction axis DR3 direction, which is a thickness direction.

The concave portion HP2 may be defined on the upper surface US-UT2 of the second glass substrate UT2. The lower surface DS-UT1 of the first glass substrate UT1 facing the upper surface US-UT2 of the second glass substrate UT2 with the bonding layer AP interposed therebetween may be a flat surface. The concave portion HP2 may be defined by the first portion WP-1 and the third portion WP-3 of the second glass substrate UT2. The concave portion HP2 may be defined by an upper surface of the first portion WP-1 and an upper surface of the third portion WP-3 of the second glass substrate UT2. The concave portion HP2 may be concavely recessed in a direction from the upper surface US-UT2 of the second glass substrate UT2 to the lower surface DS-UT2 of the second glass substrate UT2.

In the second glass substrate UT2, the third portion WP-3 may be disposed between the first portion WP-1 and the second portion WP-2 in the folding portion FP-W, and the thickness of the third portion WP-3 may increase in a direction from the first portion WP-1 to the second portion WP-2.

In the window WM-1 of an embodiment illustrated in FIG. 8, the lower surface DS-UT1 of the first glass substrate UT1 adjacent to the bonding layer AP may be a flat surface.

In the window WM-1 of an embodiment, an average thickness $t_{UT1}$ of the first glass substrate UT1 may be in a range of approximately 30 μm to approximately 50 μm. In the second glass substrate UT2, the average thickness of the first portion WP-1 may be in a range of approximately 20 μm to approximately 100 μm, and the average thickness of the second portion WP-2 may be in a range of approximately 50 μm to approximately 300 μm. The second portion WP-2 may be thicker than the first portion WP-1. The average thickness of the bonding layer AP may be in a range of approximately 10 μm to approximately 100 μm.

In the window WM-1 of an embodiment, in case that the glass substrates UT1 and UT2 and the bonding layer AP have the above-described thickness ranges, and the bonding layer AP has a high hardness and a high Young's modulus, the window WM-1 may have excellent impact resistance and good folding properties.

The window WM-1 according to an embodiment illustrated in FIG. 8 may be used as a cover window in the above-described electronic device. In case that the window WM-1 of an embodiment in which the concave portion HP2 is defined in the second glass substrate UT2 disposed in a lower portion between the two glass substrates is applied to an electronic device with an out-folding operation in which the display module DM and the window WM are folded as illustrated in FIG. 5B, the distance $D_{DM}$ between the upper surfaces of the display module facing each other may be less than the distance $D_{WM}$ between the upper surfaces of the window facing each other. However, the embodiment of the disclosure is not limited thereto.

Compare to the window WM of an embodiment illustrated in FIG. 6, a window WM-2 of an embodiment illustrated in FIG. 9 has a difference in that concave portions HP1 and HP2 are defined in each glass substrates UT1 and UT2 facing each other.

With a bonding layer AP interposed therebetween, a first concave portion HP1 may be defined on a lower surface DS-UT1 of a first glass substrate UT1, and a second concave portion HP2 may be defined on an upper surface US-UT2 of a second glass substrate UT2.

The first glass substrate UT1 may include a first portion WP-1 in the folding portion FP-W, a second portion WP-2 in the non-folding portions NFP1-W and NFP2-W and thicker than the first portion WP-1, and a third portion WP-3 disposed between the first portion WP-1 and the second portion WP-2 and whose thickness increases in a direction from the first portion WP-1 toward the second portion WP-2. In the first glass substrate UT1, the first concave portion HP1 may be defined by a lower surface of the first portion WP-1 and a lower surface of the third portion WP-3.

The second glass substrate UT2 may include a fourth portion WP-4 in the folding portion FP-W, a fifth portion WP-5 in the non-folding portions NFP1-W and NFP2-W and thicker than the fourth portion WP-4, and a sixth portion WP-6 disposed between the fourth portion WP-4 and the fifth portion WP-5 and whose thickness increases in a direction from the fourth portion WP-4 toward the fifth portion WP-5. In the second glass substrate UT2, the second concave portion HP2 may be defined by a lower surface of the fourth portion WP-4 and a lower surface of the sixth portion WP-6.

The first concave portion HP1 and the second concave portion HP2 may overlap each other in the third direction DR3, and the first concave portion HP1 and the second concave portion HP2 may be formed on the folding portion FP-W. In an embodiment, the first concave portion HP1 and the second concave portion HP2 may have shapes symmetrical to each other with the bonding layer AP interposed therebetween. However, the embodiment of the disclosure is not limited thereto.

The thickness of the first glass substrate UT1 and the thickness of the second glass substrate UT2 may be different from each other, and accordingly, the depths or sizes of the first concave portion HP1 and the second concave portion HP2 may be different from each other. For example, the average thickness of the second glass substrate UT2 may be greater than the average thickness of the first glass substrate UT1, and the depth or size of the second concave portion HP2 may be greater than that of the first concave portion HP1. However, the embodiment of the disclosure is not limited thereto. Even in case that the average thickness of the first glass substrate UT1 and the average thickness of the second glass substrate UT2 are different from each other, the first concave portion HP1 and the second concave portion HP2 may have symmetrical shapes, and in case that the average thickness of the first glass substrate UT1 and the thickness of the second glass substrate UT2 are substantially the same on the contrary, the shape of the first concave portion HP1 and the shape of the second concave portion HP2 may be different from each other.

The inclination angle of the lower surface DS-UT1 of the third portion WP-3 with respect to the lower surface DS-UT1 of the second portion WP-2 in the first concave portion HP1, and the inclination angle of the upper surface US-UT2 of the sixth portion WP-6 with respect to the upper surface US-UT2 of the fifth portion WP-5 may each be less than or equal to approximately 45 degrees.

The window WM-2 of an embodiment including the bonding layer AP having a hardness of greater than or equal to approximately 6 H, and the glass substrates UT1 and UT2 which are disposed with the bonding layer AP interposed therebetween and respectively having the concave portions HP1 and HP2 defined in portions in folding portions may have excellent folding properties and impact resistance strength.

Table 1 below shows the results of evaluation of the impact resistance in an electronic device according to an embodiment of the disclosure. The impact resistance was evaluated by a pen drop test method. The impact resistance was evaluated by dropping a pen of a certain weight onto an upper surface of a window from a height, and observing the cracking and the like of the window with the naked eye. In Table 1, the average value of the minimum height at which the cracking and the like of the window occurs in the impact resistance test was evaluated with Comparative Examples and Examples. The pen used in the pen drop test had a ball size of 0.7 φ and a weight of 5.35 g.

The pen drop test results of Comparative Examples and Examples shown in Table 1 were evaluated by performing pen-dropping in a state in which a simulation module structure was disposed on an upper portion of a surface plate. The simulation module structure used corresponds to a lamination structure of a polyethylene film having a thickness of 200 μm, an adhesive layer having a thickness of 5 μm, and a window.

Comparative Example 1 to Comparative Example 3 each used a single-layer glass substrate as a window, and Example 1 to Example 4 each used a window according to an embodiment of the disclosure. The window of used in the evaluation of Example 1 to Example 4 each has the structure of a window illustrated in FIG. 6.

In Comparative Example 1 to Comparative Example 3, the thicknesses of the single-layer glass substrates were respectively 30 μm, 50 μm, and 70 μm and in Example 1 to Example 4, the thicknesses of bonding layers were respectively 30 μm, 40 μm, 50 μm, and 60 μm. The thickness of the bonding layer in each of Examples corresponds to the thickness in a portion corresponding to a folding portion.

The structure of the window used in each of Examples is the structure of the window WM illustrated in FIG. 6 and FIG. 7A, which corresponds to a case in which the thickness of the first portion WP-1 in the first glass substrate UT1 is 30 μm, the thickness of the second portion WP-2 is 50 μm, and the thickness of the second glass substrate UT2 is 30 μm.

single glass substrate window having a thickness of 30 μm was used. Examples in FIG. 10 show evaluation results for a window having the structure of Example 1 in Table 1 described above.

Figure 10:
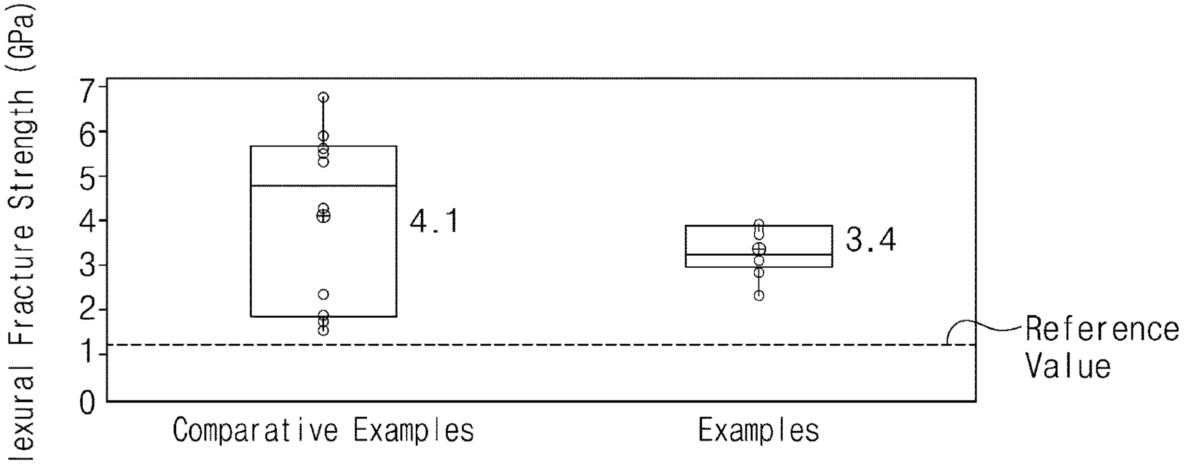
FIG. 10 is a graph showing results of flexural strength evaluation of windows of Comparative Examples and Examples.

Referring to FIG. 10, both Comparative Examples and Examples showed flexural fracture strength superior to a reference value, which is the criterion for the evaluation of good reliability above the reference value. In FIG. 10, the flexural fracture strength of 4.1 GPa of Comparative Examples and the flexural fracture strength of 3.4 GPa of Examples correspond to the center values of the test results, respectively. Therefore, referring to the results of Table 1 and FIG. 10, it can be seen that the window of an embodiment exhibits excellent flexural fracture strength, and at the same time, exhibits significantly improved impact resistance. For example, it can be said that the window of an embodiment exhibits bending or folding properties of a similar level or higher than those of Comparative Examples, and exhibits impact resistance superior to that of Comparative Examples.

A window of an embodiment may include a bonding layer having a high Young's modulus and a high hardness, and multiple glass substrates coupled by the bonding layer, and may include a concave portion defined on at least one of the glass substrates, and thus, may exhibit excellent folding and bending properties and excellent impact resistance.

An electronic device according to an embodiment may include a window disposed on an upper portion of a display module and having a structure of a bonded glass in which multiple glass substrates are bonded, wherein the window may include bonding layer having a high Young's modulus and a high hardness, and multiple glass substrates coupled by the bonding layer, and may include a concave portion defined on at least one of the glass substrates, so that the electronic device may exhibit excellent folding and bending properties and excellent impact resistance.

TABLE 1

| Classifications | Comparative Example 1 | Comparative Example 2 | Comparative Example 3 | Example 1 | Example 2 | Example 3 | Example 4 |
|---|---|---|---|---|---|---|---|
| Breakage height (cm) | 4.8 | 5.9 | 6.5 | 13.8 | 14.8 | 18.1 | 18.9 |

Referring to Table 1, it can be confirmed that compared to Comparative Examples in which a single glass substrate was used as a window, Examples in which the window of a bonded glass structure of the embodiment of the disclosure exhibit significantly improved impact resistance. For example, it can be seen that as in the embodiment of the disclosure, in case that a window has a configuration in which a bonding layer and multiple glass substrates bonded by the bonding layer are included, wherein at least one of the glass substrates has a slimmed portion, the window has more than twice the impact resistance properties compared to a case in which a single glass substrate is used as a window.

FIG. 10 shows the results of 2-point bending test in Comparative Examples and Examples. The 2-point bending test was performed by placing a window of Comparative Examples or Examples in a bent state between two jigs parallel to each other, and applying a load to the jigs to evaluate a maximum value at which the window to be tested does not break.

Comparative Examples in FIG. 10 show evaluation results for a single glass substrate window, wherein the A window of an embodiment may have a structure in which multiple glass substrates are bonded, wherein at least one of the glass substrates may have a thin thickness in a folding region compared to a non-folding region, so that the window may exhibit good folding properties and excellent impact resistance.

An electronic device of an embodiment may include a window disposed on an upper portion of a display module, and having a structure in which multiple glass substrates are bonded, wherein at least one of the glass substrates may have a thin thickness in a folding region, so that the electronic device may exhibit good folding properties and excellent impact resistance.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments.

What is claimed is:

1. A window for an electronic device comprising:

a first window glass substrate;

a second window glass substrate facing the first window glass substrate; and a bonding layer between the first window glass substrate and the second window glass substrate and bonding the first window glass substrate and the second window glass substrate, wherein the window includes a first non-folding portion, a second non-folding portion, and a folding portion, the folding portion is between the first non-folding portion and the second non-folding portion, and at least one of the first window glass substrate and the second window glass substrate includes a concave portion corresponding to the folding portion and defined on a surface adjacent to the bonding layer, wherein a pencil hardness of the bonding layer is greater than or equal to approximately 6 H.

2. The window of claim 1, wherein the first window glass substrate and the second window glass substrate are each a tempered window glass substrate.

3. The window of claim 1, wherein the concave portion is defined on a surface of the first window glass substrate adjacent to the bonding layer, and a surface of the second window glass substrate adjacent to the bonding layer is a flat surface.

4. The window of claim 3, wherein the first window glass substrate comprises:

a first portion corresponding to the folding portion;

a second portion corresponding to the first non-folding portion and the second non-folding portion; and a third portion between the first portion and the second portion, and having a thickness in a thickness direction of the first window glass substrate increasing in a direction from the first portion to the second portion, wherein an average thickness of the first portion in the thickness direction is in a range of approximately 20 μm to approximately 100 μm, and an average thickness of the second portion in the thickness direction is in a range of approximately 50 μm to approximately 300 μm.

5. The window of claim 4, wherein a surface of the third portion adjacent to the bonding layer has an inclination angle of less than or equal to approximately 45 degrees with respect to a surface of the second portion.

6. The window of claim 4, wherein a length of a surface of the third portion adjacent to the bonding layer in a cross-sectional view is in a range of approximately 10 mm to approximately 80 mm.

7. The window of claim 3, wherein an average thickness of the second window glass substrate in a thickness direction of the second window glass substrate is in a range of approximately 30 μm to approximately 50 μm.

8. The window of claim 1, wherein an average thickness of the bonding layer in a thickness direction of the first window glass substrate is in a range of approximately 10 μm to approximately 100 μm.

9. The window of claim 1, wherein a first concave portion is defined on a surface of the first window glass substrate adjacent to the bonding layer, and a second concave portion overlapping the first concave portion in a thickness direction of the first window glass substrate is defined on a surface of the second window glass substrate adjacent to the bonding layer.

10. The window of claim 1, wherein a width of the folding portion is a distance between the first non-folding portion and the second non-folding portion, and the width of the folding portion is in a range of approximately 20 mm to approximately 100 mm.

11. The window of claim 1, wherein the bonding layer comprises a first surface facing the first window glass substrate and a second surface facing the second window glass substrate, wherein the first surface of the bonding layer comprises a first convex surface protruding in a first direction and in the folding portion, and wherein the second surface of the bonding layer comprises a second convex surface protruding in a second direction opposite to the first direction and in the folding portion.

12. A window for an electronic device comprising:

a first window glass substrate comprising:

a first portion;

a second portion thicker than the first portion; and a third portion between the first portion and the second portion and having a thickness in a thickness direction of the first window glass substrate increasing in a direction from the first portion to the second portion;

a second window glass substrate facing the first window glass substrate; and a bonding layer filling a space between the first window glass substrate and the second window glass substrate and bonding the first window glass substrate and the second window glass substrate, wherein the window includes a folding portion foldable with respect to a folding axis extending in a direction, and a first non-folding portion and a second non-folding portion spaced apart from each other, the folding portion is between the first non-folding portion and the second non-folding portion, the first portion corresponds to the folding portion, and the second portion corresponds to the first non-folding portion and the second non-folding portion, wherein a pencil hardness of the bonding layer is greater than or equal to approximately 6 H.

13. The window of claim 12, wherein a concave portion recessed in a direction from a surface to another surface facing the surface of the first window glass substrate is defined on the surface of the first window glass substrate adjacent to the bonding layer by the first portion and the third portion, and a surface of the second window glass substrate adjacent to the bonding layer is a flat surface.

14. The window of claim 13, wherein an average thickness of the first portion in a thickness direction of the first window glass substrate is in a range of approximately 20 μm to approximately 100 μm, an average thickness of the second portion in the thickness direction is in a range of approximately 50 μm to approximately 300 μm, and an average thickness of the second window glass substrate in the thickness direction is in a range of approximately 30 μm to approximately 50 μm.

15. The window of claim 13, wherein a surface of the third portion adjacent to the bonding layer has an inclination angle of less than or equal to approximately 45 degrees with respect to a surface of the second portion.

16. The window of claim 12, wherein
the second window glass substrate comprises:
a fourth portion corresponding to the folding portion;
a fifth portion corresponding to the first non-folding portion and the second non- folding portion, and thicker than the fourth portion; and
a sixth portion having a thickness in a thickness direction of the second window glass substrate increasing in a direction from the fourth portion to the fifth portion, and
a concave portion recessed in a direction from a surface to another surface facing the surface of the second window glass substrate is defined on the surface of the second window glass substrate adjacent to the bonding layer by the fourth portion and the sixth portion.

17. An electronic device comprising:
a display module including a folding display portion foldable with respect to a folding axis extending in a direction, and a first non-folding display portion and a second non-folding display portion spaced apart from each other with the folding display portion interposed between the first non-folding display portion and the second non-folding display portion; and
a window on the display module, and including a folding portion corresponding to the folding display portion, and a first non-folding portion and a second non-folding portion respectively corresponding to the first non-folding display portion and the second non-folding display portion, wherein
the window comprises:
a first window glass substrate;
a second window glass substrate facing the first window glass substrate; and
a bonding layer disposed between the first window glass substrate and the second window glass substrate and bonding the first window glass substrate and the second window glass substrate, and
at least one of the first window glass substrate and the second window glass substrate includes a concave portion corresponding to the folding portion and defined on a surface adjacent to the bonding layer,
wherein a pencil hardness of the bonding layer is greater than or equal to approximately 6 H.

18. The electronic device of claim 17, wherein
the at least one of the first window glass substrate and the second window glass substrate including the concave portion comprises:
a first portion corresponding to the folding portion;
a second portion corresponding to the first non-folding portion and the second non- folding portion; and
a third portion between the first portion and the second portion, and having a thickness in a thickness direction of the first window glass substrate increasing in a direction from the first portion to the second portion,
an average thickness of the first portion in a thickness direction of the first window glass substrate is in a range of approximately 20 μm to approximately 100 μm, and
an average thickness of the second portion in the thickness direction is in a range of approximately 50 μm to approximately 300 μm.

19. The electronic device of claim 18, wherein a surface of the third portion adjacent to the bonding layer has an inclination angle of less than or equal to approximately 45 degrees with respect to a surface of the second portion.

20. The electronic device of claim 18, wherein a length of a surface of the third portion adjacent to the bonding layer in a cross-sectional view is in a range of approximately 10 mm to approximately 80 mm.

21. The electronic device of claim 17, wherein
the concave portion is defined on one of a surface of the first window glass substrate and a surface of the second window glass substrate which are adjacent to the bonding layer, and
another one of the surface of the first window glass substrate and the surface of the second window glass substrate is a flat surface.

22. The electronic device of claim 21, wherein an average thickness of one of the first window glass substrate and the second window glass substrate having the flat surface is in a range of approximately 30 μm to approximately 50 μm.

23. The electronic device of claim 17, wherein an average thickness of the bonding layer is in a range of approximately 10 μm to approximately 100 μm.

24. The electronic device of claim 17, wherein
a width of the folding portion is a distance between the first non-folding portion and the second non-folding portion, and
the width of the folding portion is in a range of approximately 20 mm to approximately 100 mm.

25. The electronic device of claim 17, wherein
a first concave portion is defined on a surface of the first window glass substrate adjacent to the bonding layer, and
a second concave portion overlapping the first concave portion in a thickness direction of the first window glass substrate is defined on a surface of the second window glass substrate adjacent to the bonding layer.

26. The electronic device of claim 17, wherein
in a folded state, a distance between upper surfaces of the window facing each other is less than a distance between upper surfaces of the display module facing each other,
the second window glass substrate is more adjacent to the display module than the first window glass substrate,
the concave portion is defined on a surface of the first window glass substrate adjacent to the bonding layer, and a surface of the second window glass substrate adjacent to the bonding layer is a flat surface.

27. The electronic device of claim 17, wherein
in a folded state, a distance between upper surfaces of the display module facing each other is less than a distance between upper surfaces of the window facing each other,
the second window glass substrate is more adjacent to the display module than the first window glass substrate,
the concave portion is defined on a surface of the second window glass substrate adjacent to the bonding layer, and
a surface of the first window glass substrate adjacent to the bonding layer is a flat surface.

* * * * *